(12) United States Patent
Krittian

(10) Patent No.: US 9,816,534 B2
(45) Date of Patent: Nov. 14, 2017

(54) HYDROSTATIC DRIVE SYSTEM IN A CLOSED CIRCUIT

(71) Applicant: Linde Hydraulics GmbH & Co. KG, Aschaffenburg (DE)

(72) Inventor: Lukas Krittian, Aschaffenburg (DE)

(73) Assignee: Linde Hydraulics GmbH & Co. KG, Aschaffenburg (DE)

( * ) Notice: Subject to any disclaimer, the term of this patent is extended or adjusted under 35 U.S.C. 154(b) by 356 days.

(21) Appl. No.: 14/557,565

(22) Filed: Dec. 2, 2014

(65) Prior Publication Data

US 2015/0204354 A1 Jul. 23, 2015

(30) Foreign Application Priority Data

Dec. 13, 2013 (DE) .......................... 10 2013 114 038

(51) Int. Cl.
| | |
|---|---|
| *F16H 61/4096* | (2010.01) |
| *F15B 1/027* | (2006.01) |
| *B60K 6/12* | (2006.01) |
| *F16H 61/44* | (2006.01) |
| *F16H 39/10* | (2006.01) |
| *F15B 1/02* | (2006.01) |
| *F15B 15/18* | (2006.01) |
| *F16H 61/42* | (2010.01) |
| *F16H 61/4139* | (2010.01) |

(52) U.S. Cl.
CPC ................ *F15B 1/027* (2013.01); *B60K 6/12* (2013.01); *F15B 1/024* (2013.01); *F15B 15/18* (2013.01); *F16H 39/10* (2013.01); *F16H 61/4096* (2013.01); *F16H 61/42* (2013.01); *F16H 61/44* (2013.01); *F15B 2201/411* (2013.01); *F15B 2211/214* (2013.01); *F16H 61/4139* (2013.01)

(58) Field of Classification Search
CPC ...................... F15B 2211/214; F16H 61/4096
See application file for complete search history.

(56) References Cited

U.S. PATENT DOCUMENTS

| | | | | |
|---|---|---|---|---|
| 3,188,963 A | * | 6/1965 | Tyler .......................... | F15B 3/00 417/225 |
| 2015/0165887 A1 | * | 6/2015 | Krittian .................... | B60K 6/12 60/414 |

FOREIGN PATENT DOCUMENTS

| | | | |
|---|---|---|---|
| DE | 10 2007 012121 | * | 1/2006 |
| DE | 102009011247 A1 | | 9/2010 |

* cited by examiner

*Primary Examiner* — F. Daniel Lopez
(74) *Attorney, Agent, or Firm* — The Webb Law Firm

(57) ABSTRACT

A hydrostatic drive system (1) has a hydrostatic pump (3) driven by a drive motor (2) and connected in a closed circuit with a hydrostatic motor (4). The hydrostatic motor (4) drives a consumer (5) and the closed circuit is formed by a first hydraulic connection (6a) and a second hydraulic connection (6b). A hydrostatic accumulator (30) can be connected with at least one of the two hydraulic connections (6a, 6b). A hydrostatic drive unit is located in an accumulator flow path (21) between one of the two hydraulic connections (6a, 6b) and the hydrostatic accumulator (30) and an additional hydrostatic drive unit is located in a tank flow path (22) between the other of the two hydraulic connections (6a, 6b) and a tank (17). The hydrostatic drive unit and the additional hydrostatic drive unit are a hydrostatic dual-flow double drive unit (20) provided in the accumulator flow path (21) and in the tank flow path (22).

32 Claims, 11 Drawing Sheets

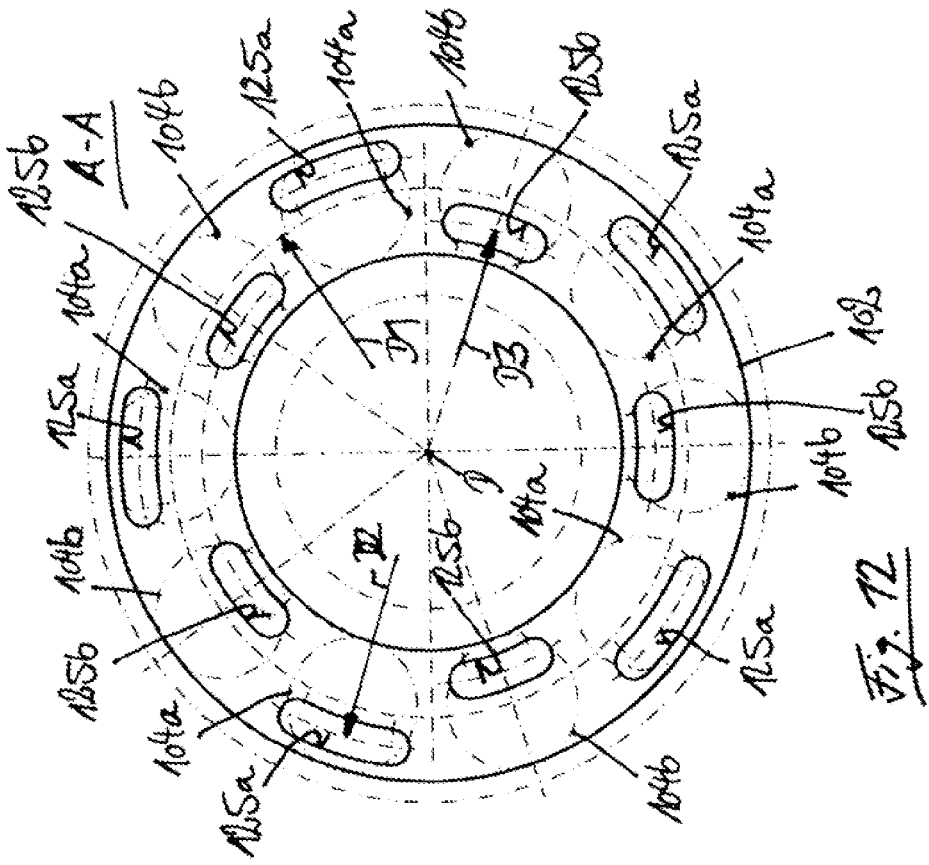
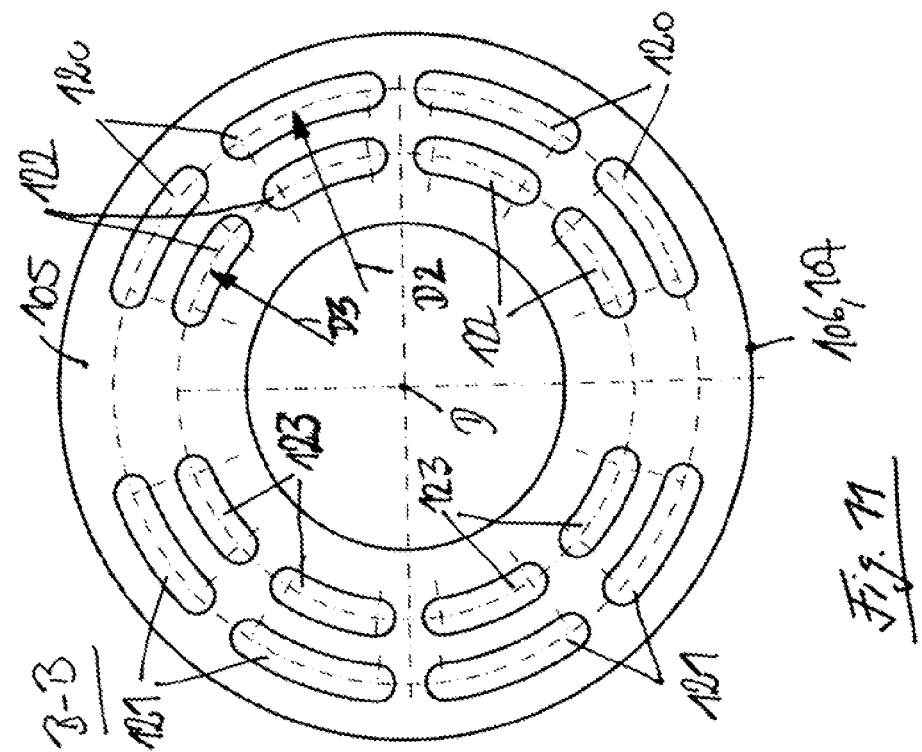

HYDROSTATIC DRIVE SYSTEM IN A CLOSED CIRCUIT

CROSS REFERENCE TO RELATED APPLICATIONS

This application claims priority to German Application No. DE 102013114038.6 filed Dec. 13, 2013, which is herein incorporated by reference in its entirety.

BACKGROUND OF THE INVENTION

Field of the Invention

This invention relates to a hydrostatic drive system with a hydrostatic pump which is driven by a drive motor and is connected in a closed circuit with a hydrostatic motor. The hydrostatic motor is in a drive connection with a consumer. The closed circuit is formed by a first hydraulic connection and a second hydraulic connection. A hydrostatic accumulator device can be connected with at least one of the two hydraulic connections for the storage of energy and the discharge of energy. A hydrostatic drive unit is located in an accumulator flow path between one of the two hydraulic connections and the hydrostatic accumulator and an additional hydrostatic drive unit is located in a tank flow path between the other of the two hydraulic connections and a tank.

Description of Related Art

Hydrostatic drive systems in a closed circuit are used for driving a consumer in vehicles such as motor vehicles or public transit vehicles, e.g. buses, preferably for urban mass transit, and for mobile self-propelled machines, in particular industrial trucks, agricultural machines, forestry machines and construction machines, such as, excavators, wheel, and telescoping loaders, tractors, combine harvesters, forage harvesters, sugar beet and potato harvesters.

With a hydrostatic accumulator for the storage of energy and the discharge of energy that can be connected with at least one of the two hydraulic connections of the closed circuit, a hybrid drive concept, and thus a hybrid function, can be realized in a hydrostatic drive system with a closed circuit. The consumer can be driven in a drive phase with the energy in the hydrostatic accumulator during a discharge operation of the hydrostatic accumulator. If the hydrostatic accumulator is operated in a charging operation during a braking or deceleration phase of the consumer and is charged with hydraulic fluid, energy can be recovered during the braking or deceleration of the consumer.

In a hydrostatic drive system in a closed circuit, it should be ensured that during the charging operation of the hydrostatic accumulator, during which a determined amount of hydraulic fluid is removed from the hydrostatic accumulator out of the high-pressure side hydraulic connection of the closed circuit, the corresponding quantity of hydraulic fluid is made up at the low-pressure side hydraulic connection of the closed circuit. Correspondingly, during discharge operation of the hydrostatic accumulator, during which a determined quantity of hydraulic fluid is fed from the hydrostatic accumulator to the high-pressure side hydraulic connection of the closed circuit, it should be ensured that the corresponding quantity of hydraulic fluid is removed from the low-pressure side hydraulic connection of the closed circuit.

To make possible this quantity and/or volumetric balancing of the closed circuit at the low-pressure side hydraulic connection during the extraction or the addition of a quantity of hydraulic fluid at the high-pressure side hydraulic connection by the hydrostatic accumulator, it is known that two additional hydrostatic drive units can be provided that balance the quantity and/or the volume of hydrostatic fluid at the two hydraulic connections of the closed circuit.

A hydrostatic drive system with a hydrostatic accumulator and two additional hydrostatic drive units that balance the quantity and/or volume at the two hydraulic connections of the closed circuit during the charging and discharging of the hydrostatic accumulator is described in DE 10 2009 011 247 A1. A first hydrostatic drive unit is located in an accumulator flow path between one of the two hydraulic connections and the hydrostatic accumulator, and is driven by the hydraulic fluid fed from the high-pressure side of the closed circuit to the hydrostatic accumulator, or by the hydraulic fluid diverted from the hydrostatic accumulator into the high-pressure side of the closed circuit. This first hydrostatic drive unit is in a drive connection with a second hydrostatic drive unit which is located in a tank flow path between the other of the two hydraulic connections and a tank. The hydraulic fluid delivered to the hydrostatic accumulator from the high-pressure side of the closed circuit or the hydraulic fluid diverted from the hydrostatic accumulator into the high-pressure side of the closed circuit therefore drives the first hydrostatic drive unit and the second hydrostatic drive unit (which is in a drive connection with the first hydrostatic unit). The second hydrostatic drive unit delivers an equivalent quantity of hydraulic fluid into the low-pressure side of the closed circuit and diverts the corresponding quantity of hydraulic fluid from the low-pressure side of the closed circuit to the tank. The first drive unit and the second drive unit can have the same displacement volume and thus an equal volumetric flow of hydraulic fluid, can be coupled with each other by means of the shaft, and can be in a drive connection. Alternatively, it is possible for the first drive unit and the second drive unit to have different displacement volumes, wherein the two drive units are coupled with each other and in a drive connection by means of the transmission, such as a spur gear transmission. The transmission translation ratio of the transmission is designed so that the two drive units displace an equal volumetric flow of hydraulic fluid. Because the two drive units displace the same volumetric flow of hydraulic fluid, the second hydrostatic drive unit (which is located between the low-pressure side hydraulic connection of the closed circuit and the tank) delivers or diverts exactly the quantity of hydraulic fluid to the low-pressure side hydraulic connection of the closed circuit as is diverted at the high-pressure side hydraulic connection into the hydrostatic accumulator (or is delivered from the hydrostatic accumulator into the high-pressure side hydraulic connection) so that the quantity and volume of hydraulic fluid in the two hydraulic connections of the closed circuit is balanced.

In DE 10 2009 011 247 A1, the two additional hydrostatic drive units that balance the quantity and/or volume of hydraulic fluid are each in the form of individual drive units which are connected with each other and are in a drive connection by means of a shaft or transmission. This design entails a great deal of construction effort and expense and occupies a large amount of space, because each of the two individual drive units has a separate housing and a separate shaft with the corresponding shaft bearing in the respective housing of the corresponding individual drive unit. The shaft required for the coupling of the two individual drive units or the transmission required for the coupling of the two individual drive units also entails a great deal of construction effort and expense and occupies a large amount of space. The hybrid function described in DE 10 2009 011 247 A1 with a hydrostatic accumulator and two additional hydrostatic drive units, each of which is in the form of an individual drive unit, therefore occupies a large amount of space, entails a great deal of extra manufacturing effort and expense, and makes the entire system more complex and expensive.

Therefore, it is an object of the invention to provide a hydrostatic drive system in which the balancing of the quantity and/or volume of hydraulic fluid with the hybrid function by the hydrostatic accumulator has a simple, compact, and/or economical construction.

SUMMARY OF THE INVENTION

The invention accomplishes this object in that the hydrostatic drive unit and the additional hydrostatic drive unit are in the form of a hydrostatic dual-flow double drive unit which is provided with or in the accumulator flow path between one of the two hydraulic connections and the hydrostatic accumulator and which is provided with or in the tank flow path between the other of the two hydraulic connections and the tank. The invention therefore teaches that only a single hydrostatic double drive unit with two separate flow paths and flow streams is provided for the quantity and/or volume balance that is required on account of hybrid function by the hydrostatic accumulator, which has the accumulator flow path as well as the tank flow path and therefore performs the function of the hydrostatic drive unit and the function of the additional hydrostatic drive unit. The dual-flow double drive unit of the invention has two delivery flows that are separated from each other, one delivery flow of which forms the accumulator flow path and the other delivery flow of which forms the tank flow path. A dual-flow double drive unit occupies a small amount of space, so that the quantity and/or volume balance necessary for the hybrid function can be achieved in a compact manner. In addition, a dual-flow double drive unit has a simple and economical construction compared to two separate hydrostatic individual drive units of the prior art. A further advantage of the dual-flow double drive unit is that with the double drive unit, it is possible in a simple manner in a hydrostatic drive with a closed circuit to achieve a theoretically exact balancing of the amount of hydraulic fluid in the low-pressure side hydraulic connection during the extraction or the addition of a quantity of hydraulic fluid to the high-pressure side hydraulic connection, so that the quantity and/or volume balance in the two hydraulic connections of the closed circuit is guaranteed with little extra construction effort or expense.

In one preferred embodiment, the double drive unit has the same displacement volume for the accumulator flow path and the tank flow path. The double drive unit, which performs the function of the hydrostatic drive unit and the function of the additional hydrostatic drive unit, therefore supplies two equal delivery flows and on account of the same displacement volume in the two flow paths makes possible a theoretically exact balancing of the amount of hydraulic fluid in the low-pressure side hydraulic connection during the extraction or the addition of a quantity of hydraulic fluid at the high-pressure side hydraulic connection.

In one embodiment of the invention, with the double drive unit, the accumulator flow path between one of the two hydraulic connections and the hydrostatic accumulator runs from the one of the two hydraulic connections to a first port of the double drive unit and from a second port of the double drive unit to the hydrostatic accumulator. The double drive unit therefore supplies a delivery flow to the first port and to the second port, which forms the accumulator flow path and charges or discharges the hydrostatic accumulator, depending on the direction of the flow.

Furthermore, with the double drive unit, the tank flow path between the other of the two hydraulic connections and the tank runs from the other hydraulic connection to a third port of the double drive unit and from a fourth port of the double drive unit to the tank. The double drive unit therefore delivers on the third port and the fourth port an additional delivery flow that forms the tank flow path, and hydraulic fluid is added to or diverted from the low-pressure side hydraulic connection, depending on the direction of flow.

The dual-flow double drive unit therefore has a total of four ports, two of which deliver one of the two separate delivery flows, and are therefore associated with and form the accumulator flow path and the tank flow path. The two separate flow paths and separate delivery flows can be created in the double drive unit with little extra construction effort or expense.

In one advantageous embodiment of the invention, the double drive unit is in the form of a piston displacement machine, whereby the hydrostatic drive unit and the additional hydrostatic drive unit have the same displacement volumes. The construction of the double drive unit in the form of a piston displacement machine makes it possible in a simple manner to have two separate flow paths and separate delivery flows for the accumulator flow path and for the tank flow path.

In one preferred embodiment of the invention, the double drive unit has a rotating cylinder barrel in which at least one longitudinally displaceable piston of the hydrostatic drive unit and of the additional hydrostatic drive unit are located. The hydrostatic drive unit and the additional hydrostatic drive unit each have the same number of pistons and the pistons all execute strokes of equal length. As a result, the effort and expense required for construction, as well as the space required, are reduced even further because the drive unit of the invention with the two flow paths and two separate delivery flows has only one single cylinder barrel, in which the pistons of the hydrostatic drive unit and the pistons of the additional hydrostatic drive unit are located. With the same number of pistons and equal-length strokes of the pistons (provided the piston surface areas of the respective pistons are equal) it also becomes possible in a simple manner and with little added construction effort or expense to make the displacement volumes for the accumulator flow path and the tank flow path, and thus the two separate delivery flows, equal.

In one advantageous embodiment of the invention, the double drive unit has a housing in which the cylinder barrel is rotationally mounted by means of a bearing. The double drive unit of the invention therefore has only one single housing and one bearing for the rotating cylinder barrel, for example the rotational mounting of the cylinder barrel on a single shaft which is rotationally mounted by means of only one shaft bearing in the housing. This design has additional advantages with regard to the amount of construction effort and expense required and the compact size of the double drive unit.

With reference to the compact size and low requirement for additional construction effort and expense for the double drive unit, it is also advantageous if, as in one embodiment of the invention, the pistons of the hydrostatic drive unit and the pistons of the additional hydrostatic drive unit are located in alternation in the peripheral direction of the cylinder barrel.

The two separate flow paths and thus the two separate delivery flows can be formed by the double drive unit in a simple manner if, as in one embodiment of the invention, a control body of the double drive unit is provided with accumulator control bores that control the accumulator flow path, and with tank control bores that control the tank flow path, wherein the pistons of the hydrostatic drive unit actuate only the accumulator control bores and the pistons of the additional hydrostatic drive unit actuate only the tank control bores.

The double drive unit of the invention can be in the form of a radial piston machine.

In one preferred embodiment of the invention, the double drive unit is in the form of an axial piston machine, wherein the pistons of the hydrostatic drive unit and the pistons of the additional hydrostatic drive unit are located on the same reference diameter in the rotating cylinder barrel. This arrangement of the pistons of the hydrostatic drive unit and the pistons of the additional hydrostatic drive unit in the rotating cylinder barrel on the same reference diameter simplifies the construction of the double drive unit and makes it possible in a simple manner to achieve equal displacement volumes for the accumulator flow path and the tank flow path, and thus equal delivery flows for the two delivery flows, as well as equal length piston strokes. The double drive unit in the form of an axial piston machine can be in the form of a swashplate machine or a bent axis machine.

In an axial piston machine, in which the pistons of the hydrostatic drive unit and the pistons of the additional hydrostatic drive unit are located in the rotating cylinder barrel on the same reference diameter, the two separate flow paths and thus the two separate delivery flows of the double drive unit can be achieved in a simple manner if, as in one advantageous embodiment of the invention, the control body is in the form of a valve plate on which the cylinder barrel is supported with one end surface. The accumulator control bores are located on a first reference diameter and the tank control bores are located on the second reference diameter, which is different from the first reference diameter.

On an axial piston machine of this type, in which the pistons of the hydrostatic drive unit in the pistons of the additional hydrostatic drive unit are located in the rotating cylinder barrel on the same reference diameter, and the accumulator control bores as well as the tank control bores are located on different reference diameters in the valve plate, the two separate flow paths and thus the two separate delivery flows of the double drive unit can be achieved in a simple manner if the pistons are longitudinally displaceable in piston bores of the cylinder barrel. Each cylinder bore is provided with a communicating channel for communication with the accumulator control bores or the tank control bores. The communicating channels of the pistons of the hydrostatic drive unit are located on the first reference diameter and the connecting channels of the pistons of the other hydrostatic drive unit are located on the second reference diameter.

In one embodiment of the invention, the double drive unit can be in the form of a constant displacement machine, wherein the hydrostatic drive unit and the additional hydrostatic drive unit each have a fixed displacement volume.

In an alternative configuration of the invention, the double drive unit can be in the form of a variable displacement machine, wherein the hydrostatic drive unit and the additional hydrostatic drive unit each have a variable displacement volume. Because in a variable displacement machine, the displacement volumes of the two hydrostatic power plants always vary simultaneously by the same amount, when the double drive unit is in the form of a variable displacement machine, it also becomes possible to achieve a theoretically exact balancing of the quantity of hydraulic fluid in the low-pressure side hydraulic connection when a quantity of hydraulic fluid is extracted or added at the high-pressure side hydraulic connection.

In one embodiment of the invention, the accumulator flow path is connected in a fixed manner to the one of the two hydraulic connections of the closed circuit and the tank flow path is connected in a fixed manner to the other hydraulic connection of the closed circuit. A connection of this type of the dual-flow double drive unit to the two hydraulic connections of the closed circuit has a simple construction from a switching point of view and makes it possible to charge the hydrostatic accumulator on the primary side with energy from the drive motor. The energy stored in the hydrostatic accumulator can then be used in a drive phase of the consumer for a selected direction of movement of the consumer to drive the consumer, so that with the hydrostatic accumulator, it becomes possible to assist the drive motor during a drive phase of the consumer.

In one embodiment of the invention, a valve device is provided with which, in the first control position, the accumulator flow path is connected to the first hydraulic connection of the closed circuit and, simultaneously, the tank flow path is connected to the second hydraulic connection of the closed circuit. In a second control position, the accumulator flow path is connected to the second hydraulic connection of the closed circuit and, simultaneously, the tank flow path is connected to the first hydraulic connection of the closed circuit. With the valve device of this type, it becomes possible for the accumulator flow path and the tank flow path to be optionally connected with each of the two hydraulic connections of the closed circuit, and thus the fluid dynamics connection of the ports of the double drive units to the two hydraulic lines of the closed circuit can be interchanged. With the valve device of this type, in connection with the hydrostatic accumulator, it is possible in a simple matter for both directions of movement of the consumer, to charge the hydrostatic accumulator during a braking phase of the consumer and, thus, to recover the braking energy of the consumer. The valve device also makes it possible to then use the energy stored in the hydrostatic accumulator during a drive phase of the consumer to drive the consumer for both directions of movement of the consumer. The dual-flow double drive unit guarantees the quantity and/or volume balance in the low-pressure side hydraulic connection of the closed circuit.

In one advantageous embodiment of the invention, the valve device is connected by means of a first connecting line with the first hydraulic line of the closed circuit, by means of a second connecting line with the second hydraulic connection of the closed circuit, by means of an accumulator line with the first port of the double drive unit, and by means of a tank line with the third port of the double drive unit.

In the first control position, the valve device connects the first connecting line with the accumulator line and the second connecting line with the tank line. In the second control position, the valve device connects the first connecting line with the tank line and the second connecting line with the accumulator line. With a valve device of this type, it becomes possible in a simple manner for both directions of movement of the consumer to recover the braking energy during a braking phase of the consumer and to drive the consumer with the hydrostatic accumulator during a drive phase of the consumer.

In one development of the invention, the valve device has a closed position in which the connection of the connecting lines with the accumulator line and/or the tank line is shut off. With a closed position of this type of the valve device, the operation of the double drive unit and, thus, the hybrid function formed by the double piston accumulator can be activated or deactivated in a simple manner.

In one embodiment of the invention, the valve device is a four-port, two-position control valve that has the first control position and the second control position. With a control valve of this type, it is possible with little added construction effort or expense to form the hybrid function with the hydrostatic accumulator and the double drive unit in both directions of movement of the consumer.

In an alternative embodiment of the invention, the valve device is a four-port, three-position control valve, which has the first control position and the second control position and is provided with the closed position as a middle position. With a control valve of this type, it is possible with little extra construction effort or expense to form the hybrid function with the hydrostatic accumulator in both directions of movement of the consumer and to deactivate the hybrid function by means of the closed position.

In an alternative embodiment of the invention, the valve device is formed by a plurality of individual valves. The design of the valve device as a distributed construction with a plurality of individual valves, e.g., simple switching valves, also makes it possible with little added construction effort or expense to form the hybrid function with the hydrostatic accumulator in both directions of movement of the consumer as well as to deactivate the double drive unit and the hybrid function.

In one advantageous embodiment of the invention, the valve device can have a first shuttle valve connected on the input side to the first connecting line and to the second connecting line, and connected on the output side to the tank line, and a second shuttle valve connected on the input side to the first connecting line and to the second connecting line, and connected on the output side to the accumulator line.

In the first control position, the first shuttle valve advantageously connects the second connecting line with the tank line and, in the second control position, connects the first connecting line with the tank line. The second shuttle valve, in the first control position, connects the first connecting line with the accumulator line and, in the second control position, connects the second connecting line with the accumulator line. With a valve device of this type formed by two shuttle valves, it becomes possible in a simple manner to recover the braking energy for both directions of movement of the consumer during a braking phase of the consumer, and during a drive phase of the consumer to drive the consumer with the hydrostatic accumulator.

In an alternative embodiment of the invention, a controlled deactivation of the hybrid function formed by the hydrostatic accumulator can be achieved with little added construction or expense if at least one switching valve with a closed position and an open position is located in the accumulator flow path or the tank flow path.

The valve device can be a switching valve or a proportional valve.

In the drive system of the invention, the hydrostatic pump is a variable pump with a variable displacement volume, preferably a bilaterally variable displacement pump, and the hydrostatic motor is a constant motor with a fixed displacement volume or a variable motor with a variable displacement volume.

To vary the displacement volume of the variable pump and/or of the variable motor, an electronic control device is advantageously provided in which operating strategies are stored to charge the hydrostatic accumulator, as a function of the operating conditions of the drive system, with energy from the drive motor and/or during braking operation of the consumer with braking energy from the consumer. It therefore becomes possible to charge the hydrostatic accumulator during certain operating conditions in which excess energy occurs at the drive motor and/or during braking operation of the consumer with the braking energy that occurs to make an energy recovery possible. The electronic control device is in communication with corresponding signal generators, on the basis of which the current operating condition and/or braking operation of the consumer can be determined, for example, by an accelerator pedal device or a brake pedal when the consumer is the traction drive a vehicle.

In the drive system of the invention, operating strategies are stored in the electronic control device to use the hydraulic fluid from the charged hydrostatic accumulator, depending on the operating conditions of the drive system, to drive the hydrostatic motor and/or to drive the hydrostatic pump. As a result of the drive of the hydrostatic motor with hydraulic fluid from the hydrostatic accumulator, a booster drive of the running drive motor can be achieved. If the hydraulic fluid from the charged hydrostatic accumulator is used to drive the hydrostatic pump, the hydrostatic pump can be used as a hydraulic starter of the shutoff drive motor. The hydrostatic accumulator of the invention can therefore be used to assist the running drive motor and/or as a hydraulic starter in the framework of a start-stop function of the drive motor, whereby an economical start-stop function of the drive motor can be achieved on account of the robust construction and operation of the hydrostatic displacement machine.

To be able to start the shutoff internal combustion engine in combination with the hydrostatic pump, in one development of the invention the variable displacement motor can be set to a displacement volume of zero, and during the drive of the hydrostatic pump by the hydraulic fluid from the charged hydrostatic accumulator, the variable displacement motor is set to a displacement volume of zero. It thereby becomes possible for hydraulic fluid from the hydrostatic accumulator not to drive the hydrostatic motor and to flow only to the hydrostatic pump, where it can be used to start the shutoff drive motor.

The electronic control device is advantageously in communication with a pressure sensor that measures the charging pressure of the hydrostatic accumulator.

The switching valve can advantageously be actuated electrically and for its actuation is in communication with the electronic control device. The hybrid function formed by the hydrostatic accumulator can therefore be activated and deactivated by means of the electronic control device by a corresponding actuation of the switching valve in a simple manner as a function of the operating conditions of the drive system.

In one embodiment of the invention, the valve device can be actuated electrically/electronically and for its actuation is in communication with the electronic control device. With the electronic control device, the valve device can be actuated in a simple manner as a function of the operating conditions of the drive system to charge or discharge the hydrostatic accumulator.

In one alternative embodiment of the invention, the valve device can be actuated hydraulically, and for its actuation is connected with the hydraulic connections of the closed circuit. A hydraulically controlled valve device of this type, which is controlled by the pressures present in the hydraulic connections of the closed circuit, therefore forms a hydraulically controlled shuttle valve that controls the connection of the ports of the double drive unit with the two hydraulic connections.

For this purpose, a first control pressure line is advantageously provided which runs from the first hydraulic connection of the closed circuit to a control surface of the valve device that acts in the direction of the first control position, and a second control pressure line which runs from the second hydraulic connection of the closed circuit to a control surface of the valve device that acts in the direction of the second control position. It is thereby possible in a simple manner to connect the high-pressure side hydraulic connection of the closed circuit with the accumulator flow path and the low-pressure side hydraulic connection of the closed circuit with the tank flow path.

The consumer can be in the form of a slewing gear of a vehicle driven by the hydrostatic motor. With the double drive unit of the invention in connection with a hydrostatic accumulator, on a vehicle with a slewing gear, such as a mobile machine in the form of an excavator during braking operation of the slewing gear, energy can be recovered and a boost can be provided to the drive motor during the acceleration of the slewing gear.

Alternatively, the consumer can be the traction drive of a vehicle, for example, a drive axle with at least two driven drive wheels driven by the hydrostatic motor. With the double drive unit of the invention in combination with the hydrostatic accumulator, on a vehicle with a traction drive comprising a drive axle, energy can be recovered during braking operation of the vehicle and used to provide a boost to the drive motor during the acceleration of the vehicle.

Alternatively, the consumer can be a winch, for example, a crane winch.

In one development of the invention, the hydrostatic drive of the invention can be a continuously variable hydrostatic branch of a power split transmission.

The invention further relates to a vehicle with a hydrostatic drive system of the invention. With the double drive unit that has two flows and two separate delivery flows and can be connected with the hydraulic connections of the hydrostatic circuit and has the accumulator flow path to the hydrostatic accumulator and the tank flow path to the tank, it is possible to create a compact serial hybrid in a vehicle in a simple and economical manner.

BRIEF DESCRIPTION OF THE DRAWINGS

Additional advantages and details of the invention are described in greater detail below with reference to the accompanying schematic figures illustrating exemplary embodiments of the invention, in which like reference numbers identify like parts throughout.

FIG. 11 shows a section along line A-A in FIG. 10; and

FIG. 12 shows a section along line BB in FIG. 10.

DESCRIPTION OF THE PREFERRED EMBODIMENTS

Figure 1:
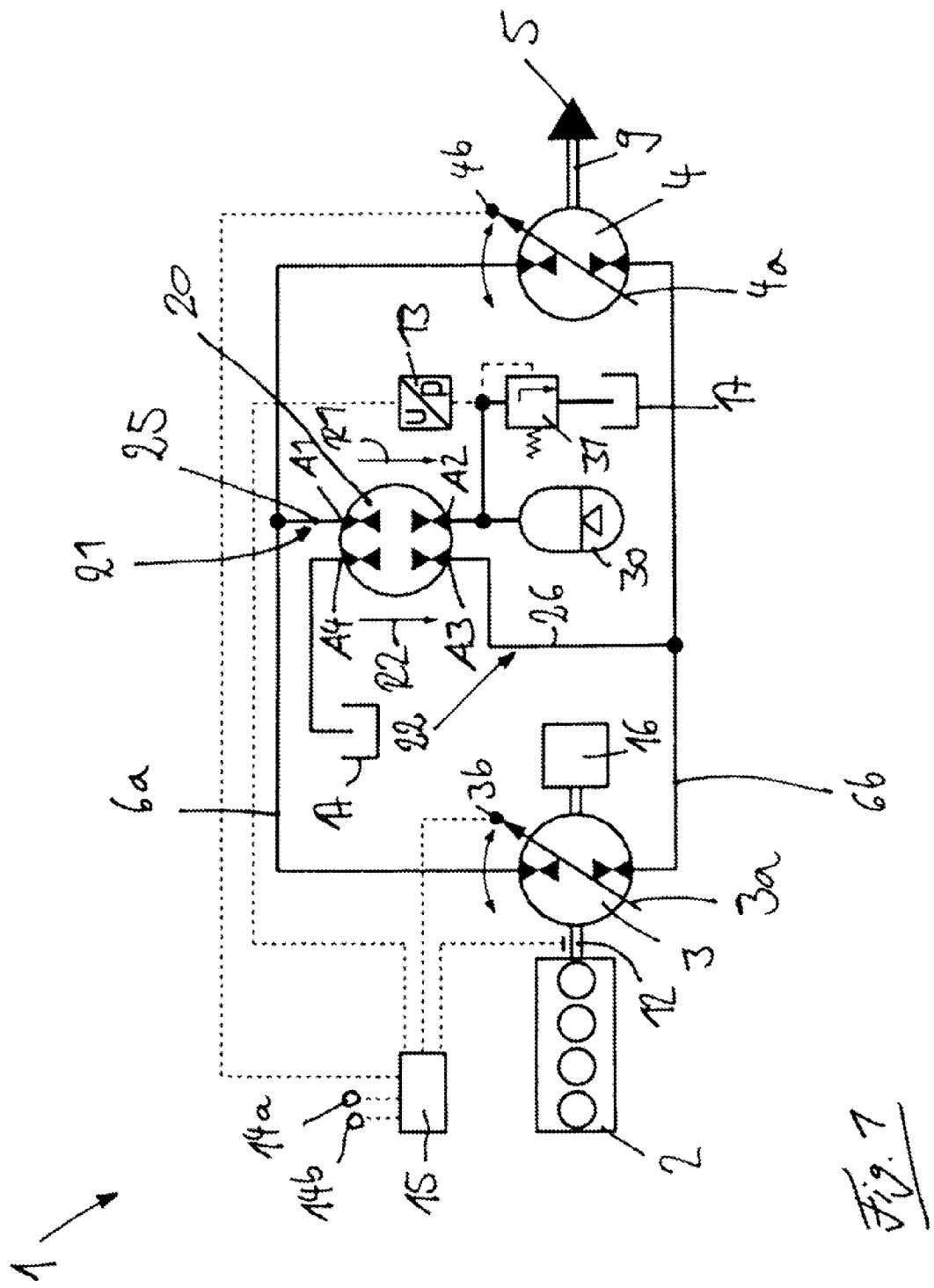
FIG. 1 shows a first embodiment of a hydrostatic drive system of the invention.
Figure 2:
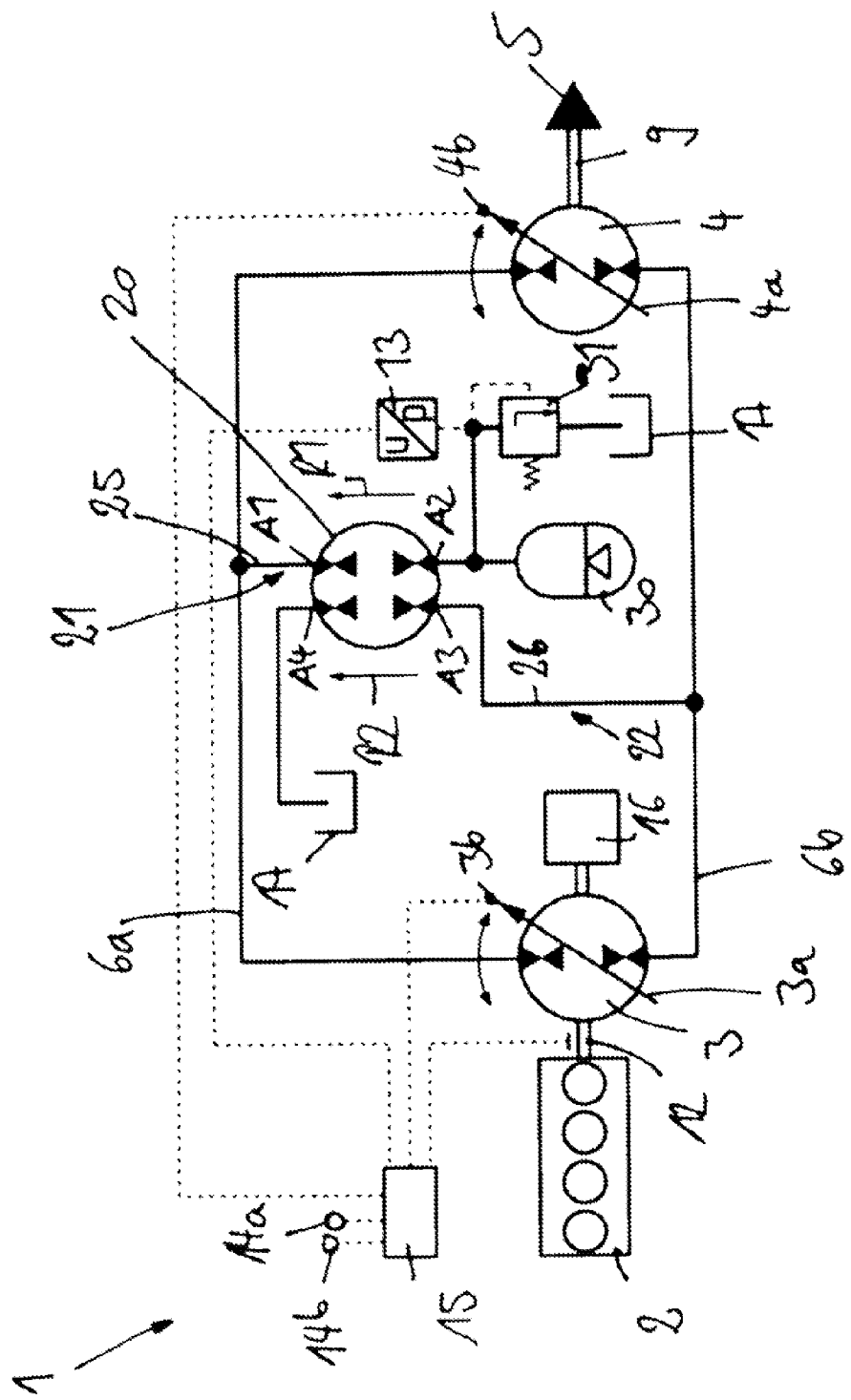
FIG. 2 shows the hydrostatic drive system of FIG. 1 in another mode of operation.

FIGS. 1 and 2 show a drive train of a vehicle with a hydrostatic drive system 1 of the invention.

The hydrostatic drive 1 has a hydrostatic pump 3 which is driven by a drive motor 2 and is connected in a closed circuit with a hydrostatic motor 4. The motor 4 is in a drive connection with a consumer 5. The closed circuit is formed by a first hydraulic connection 6a and a second hydraulic connection 6b.

In the illustrated exemplary embodiment the drive motor 4 is an internal combustion engine.

In the illustrated exemplary embodiment (e.g. FIG. 3), the consumer 5 is a traction drive system of a vehicle and comprises a drive axle 7 with two driven wheels 8a, 8b. An output shaft 9 of the motor 4 is in communication with a differential transmission 10 of the drive axle 7, which drives the wheels 8a, 8b by means of corresponding output shafts. The drive axle 7 can be driven directly by the motor 4. In the illustrated exemplary embodiment, the motor 4 is in a drive connection with the drive axle 7 with the interposition of a transmission 11.

The pump 3 is in an operative connection for its drive with a drive shaft 12 of the drive motor 2. The pump 3 is a displacement variable pump with a variable displacement volume which can be varied in both directions, starting from a null position in which the displacement volume is zero, so that depending on the direction of actuation, the pump 3 can deliver into both hydraulic connections 6a, 6b.

The displacement volume of the pump 3 can be controlled electrically (electronically) or electro-hydraulically, in particular electro-proportionally. For this purpose, a displacement volume control device 3a of the pump 3 can be electrically actuated by means of an electrical actuator device 3b which for its actuation is in communication with an electronic control device 15.

The motor 4 can be a constant motor with a fixed displacement volume. In the illustrated exemplary embodiment, the motor 4 is a variable displacement motor. The motor 4 can be controlled electrically or electro-hydraulically, in particular electro-proportionally. A displacement volume control device 4a of the motor 4 can be electrically actuated by means of an electrical actuator device 4b which for its own actuation is in communication with the electronic control device 15.

On the input side, the electronic control device 15 is also in communication with signal generators 14a, 14b, which can be in the form of an accelerator pedal device 14a and a brake pedal device 14b.

Depending on the delivery direction of the pump 3 or depending on the operating status (drive phase or braking phase) of the consumer 5, one of the hydraulic lines 6a or 6b, respectively, forms the high-pressure side hydraulic connection of the closed circuit and the respective other hydraulic line 6b or 6a forms the low-pressure side hydraulic connection of the closed circuit.

If the displacement volume control device 3a of the pump 3 is set so that the pump 3 delivers into the first hydraulic connection, the drive system is in a drive phase and the motor 4 is driven in a first direction of movement which, in the illustrated traction drive as the consumer 5, corresponds to the forward direction of travel of the vehicle. In the drive phase in the first direction of movement of the consumer 5, the first hydraulic connection 6a forms the high-pressure side hydraulic connection and the second hydraulic connection 6b forms the low-pressure side hydraulic connection of the closed circuit. If the drive system enters into a braking phase during the deceleration of the consumer 5, the pressure relationships in the hydraulic connections 6a, 6b are reversed. The motor 4 functions as a pump and delivers hydraulic fluid via the second hydraulic connection 6b to the pump 3 which functions as a motor. In the braking phase in the first direction of movement of the consumer 5, the second hydraulic connection 6b forms the high-pressure side hydraulic connection and the first hydraulic connection 6a forms the low-pressure side hydraulic connection of the closed circuit.

If the displacement volume control device 3a of the pump 3 is set so that the pump 3 delivers into the second hydraulic connection 6b, the drive system is in a drive phase and the motor 4 is driven in a second direction of movement, which in the illustrated traction drive as the consumer 5 corresponds to the travel of the vehicle in reverse. In the drive phase of the consumer 5 in the second direction of movement, the second hydraulic connection 6b represents the high-pressure side hydraulic connection and the first hydraulic connection 6a the low-pressure side hydraulic connection of the closed circuit. If the drive system enters a braking phase during the deceleration of the consumer 5, the pressure relationships in the hydraulic connections 6a, 6b are reversed. The motor 4 functions as a pump and delivers hydraulic fluid via the first hydraulic connection 6a to the pump 3 which functions as a motor. During the braking phase in the second direction of movement of the consumer 5, the first hydraulic connection 6a represents the high-pressure side hydraulic connection and the second hydraulic connection 6b the low-pressure side hydraulic connection of the closed circuit.

The closed circuit is also provided with a discharge device that connects the respective low-pressure side hydraulic connection of the closed circuit with a tank. The volumetric flow that is discharged from the closed circuit to the discharge device is balanced by means of a charging device 16 that is formed by a charging pump of the drive train and is driven by the drive motor 2. The charging pump is operated in an open circuit, takes in hydraulic fluid from the tank, and delivers into a delivery line. The delivery line of the charging pump is in communication by means of respective charging valves with the hydraulic connections 6a, 6b, so that the volumetric flow of hydraulic fluid discharged at the discharge device is made up by the charging pump at the low-pressure side hydraulic connection 6a or 6b, respectively.

Depending on the design of the vehicle, the drive train can comprise an additional hydraulic system, such as the working hydraulics of a mobile machine.

The illustrated drive train is a serial hybrid, for which purpose the closed circuit is provided with a hydrostatic accumulator 30 in the form of a high pressure accumulator, which can be connected with at least one of the two hydraulic connections 6a, 6b of the closed circuit for the absorption of energy and for the discharge of energy from or into the closed circuit.

The invention teaches that a hydrostatic, dual-flow double drive unit 20 is provided which delivers two separate delivery flows. The double drive unit 20, with a first delivery flow, has the function of a hydrostatic drive unit in an accumulator flow path 21 between one of the two hydraulic connections 6a or 6b, respectively, and the hydrostatic accumulator 30. The double drive unit 20 has, with the second delivery flow, has the function of an additional hydrostatic drive unit in a tank flow path 22 between the other of the two hydraulic connections 6b or 6a, respectively, and a tank 17. The two-flow double drive unit 20 therefore delivers to separate delivery flows with the accumulator flow path 21 and with the tank flow path 22.

The accumulator flow path 21 leads between one of the two hydraulic connections 6a or 6b, respectively, and the hydrostatic accumulator 30, from the one of the two hydraulic connections 6a or 6b, respectively, to a first port A1 of the double drive unit 20 and from a second port A2 of the double drive unit 20 to the hydrostatic accumulator 30. Therefore, the double drive unit 20 delivers the first delivery flow to the two ports A1, A2.

The tank flow path 22 leads between the other of the two hydraulic connections 6b or 6a, respectively, and the tank 17, from the other hydraulic connection 6b or 6a, respectively, to a third port A3 of the double drive unit 20 and from a fourth port A4 of the double drive unit 20 to the tank 17. The double drive unit 20 therefore delivers the second delivery flow to the two additional ports A3, A4.

The dual-flow double drive unit 20 of the invention is provided with equal displacement volumes for the accumulator flow path 21 and the tank flow path 22, so that the double drive unit 20 delivers equally large delivery flows.

In the exemplary embodiment illustrated in FIG. 1, the accumulator flow path 21 is connected in a fixed manner to the hydraulic connection 6a of the closed circuit and the tank flow path 22 is connected in a fixed manner to the other hydraulic connection 6b of the closed circuit. The accumulator flow path 21 is formed by a hydraulic line 25 that leads from the hydraulic connection 6a to the hydrostatic accumulator 30. The hydrostatic drive unit of the double drive unit 20 is located in the hydraulic line 25. The tank flow path 22 is formed by a hydraulic line 26 that leads from the hydraulic connection 6b to the tank 17, in which line the additional hydrostatic drive unit of the double drive unit 20 is located.

For the protection of the accumulator charge pressure in the hydrostatic accumulator 30, there is a pressure protection valve 31, such as a pressure relief valve, which is connected on the output side with the tank 17.

For the measurement of the charging pressure present in the hydrostatic accumulator 30, a pressure sensor 13 is provided which is in communication with the electronic control device 15. Pressure sensors that are not illustrated in detail can also be provided for the measurement of the pressures in the two hydraulic lines 6a, 6b, which are in communication with the control device 15.

FIG. 1 illustrates the charging operation of the hydrostatic accumulator 30. During charging operation, hydraulic fluid flows via the accumulator flow path 21 in the direction of flow indicated by the arrow R1 from the high-pressure side hydraulic connection 6a into the hydrostatic accumulator 30, whereupon the hydrostatic drive unit of the double drive unit 20 associated with the hydraulic flow path 21 is driven in a first direction. The hydraulic fluid flowing into the hydrostatic accumulator 30 in the accumulator flow path 21 also drives the additional hydrostatic drive unit of the double drive unit 20, which is associated with the tank flow path 22, as a result of which the additional hydrostatic drive unit delivers hydraulic fluid from the tank 17 into the low-pressure side hydraulic connection 6b and thus hydraulic fluid into the low-pressure side hydraulic connection 6b via the tank flow path 22 in the direction of flow indicated by the arrow R2.

FIG. 2 illustrates the discharge operation of the hydrostatic accumulator 30. In discharge operation, hydraulic fluid flows via the accumulator flow path 21 in the direction of flow indicated by the arrow R1 from the hydrostatic accumulator 30 into the high-pressure side hydraulic connection 6a, whereupon the hydrostatic drive unit of the double drive unit 20 is driven in an opposite, second direction. The hydraulic fluid flowing out of the hydrostatic accumulator 30 in the accumulator flow path 21 also drives the additional hydrostatic drive unit of the double drive unit 20, which is associated with the tank flow path 22, as a result of which the other hydrostatic drive unit diverts hydraulic fluid from the low-pressure side hydraulic connection 6b into the tank 17 via the tank flow path 22 in the direction of flow indicated by the arrow R2.

Because the double drive unit 20 of the invention is provided with equal displacement volumes for the accumulator flow path 21 and the tank flow path 22, and therefore the two flow paths are equally large, and the hydraulic fluid delivered to or diverted from the hydrostatic accumulator 30 via the accumulator flow path 21 drives both drive units of the double drive unit 20 equally, it can be guaranteed that the theoretically exactly equal amount of hydraulic fluid that is extracted by means of the accumulator flow path 21 from the high-pressure side hydraulic connection 6a of the closed circuit or is added to the high-pressure side hydraulic connection 6a of the closed circuit is added via the tank flow path 22 into the low-pressure side hydraulic connection 6b of the closed circuit or is extracted from the low-pressure side hydraulic connection 6b of the closed circuit.

During charging and discharging operation of the hydrostatic accumulator 30, the double drive unit 20 of the invention therefore ensures the quantity and/or volume balance in the two hydraulic connections 6a, 6b of the closed circuit. If there are minor differences in the displacement volumes of the two drive units of the dual-flow double drive unit, they can be made up by the charging device 16.

The embodiment in FIGS. 1 and 2, in which the hydrostatic accumulator 30 is connected in a fixed manner by means of the hydraulic line 25 (that forms the accumulator flow path 21) to the first hydraulic connection 6a of the closed circuit, and the tank 17 is connected in a fixed manner by means of the hydraulic line 26 (that forms the tank flow path 22) to the second hydraulic connection 6b of the closed circuit, is particularly well-suited for the primary-side charging of the hydrostatic accumulator 30 with energy from the drive motor 2. The pump 3 that delivers into the first high-pressure side hydraulic connection 6a and is driven by the drive motor 2 therefore delivers hydraulic fluid via the hydraulic line 25 into the hydrostatic accumulator 30. The balancing of the volumetric flow in the closed circuit is guaranteed in that the quantity of hydraulic fluid extracted from the high-pressure side of the closed circuit by the double drive unit 20 during the charging of the hydrostatic accumulator 30 is added from the tank 17 via the hydraulic line 26 in the low-pressure side hydraulic connection 6b on the low-pressure side of the closed circuit.

When the hydrostatic accumulator 30 is charged, the energy stored in the hydrostatic accumulator can be used to drive the motor 4. Hydraulic fluid from the hydrostatic accumulator 30 is added via the hydraulic line 25 of the high-pressure side hydraulic connection 6a. The balancing of the volumetric flow in the closed circuit is guaranteed in that the quantity of hydraulic fluid added by the double drive unit 20 during the discharge of the hydrostatic accumulator 30 into the high pressure side of the closed circuit is extracted via the hydraulic line 26 from the low-pressure side hydraulic connection 6b from the low pressure side of the closed circuit and diverted to the tank 17.

The charging or discharging of the hydrostatic accumulator 30 can be influenced or controlled by means of the electronic control device 15 and a corresponding setting of the displacement volume control device 3a of the pump 3, and optionally of the displacement volume control device 4a of the motor 4. Corresponding operating strategies for the charging or discharging of the hydrostatic accumulator 30 (depending on the operating conditions of the drive) are stored in the electronic control device 15. The signals from the signal generators 14a, 14b and from the pressure sensor 13 can be analyzed by the electronic control device 15, and the displacement volume control device 3a of the pump 3, and optionally the displacement volume control device 4a of the motor 4, can be optimally set corresponding to the operating condition of the drive system 1.

The hydrostatic drive system 1 illustrated in FIG. 1 or 2 is advantageously suitable for use in a vehicle which is operated in travel cycles where there are only brief delays between the cycles and therefore there is little potential for charging the hydrostatic accumulator 30 with braking energy during a braking phase of the consumer 5. The hydrostatic drive system 1 illustrated in FIG. 1 or 2 is also preferably suitable for use in a vehicle which is provided with a speed of travel in reverse which is less than the maximum speed of forward travel.

If the pump 3 and the motor 4 have a continuously variable displacement volume, in the event of a rapid pivoting of the displacement volume control devices 3a, 4a in the exemplary embodiment illustrated in FIGS. 1 and 2 during the braking phase of the consumer 5, the braking energy can be stored by charging the hydrostatic accumulator 30.

Figure 3:
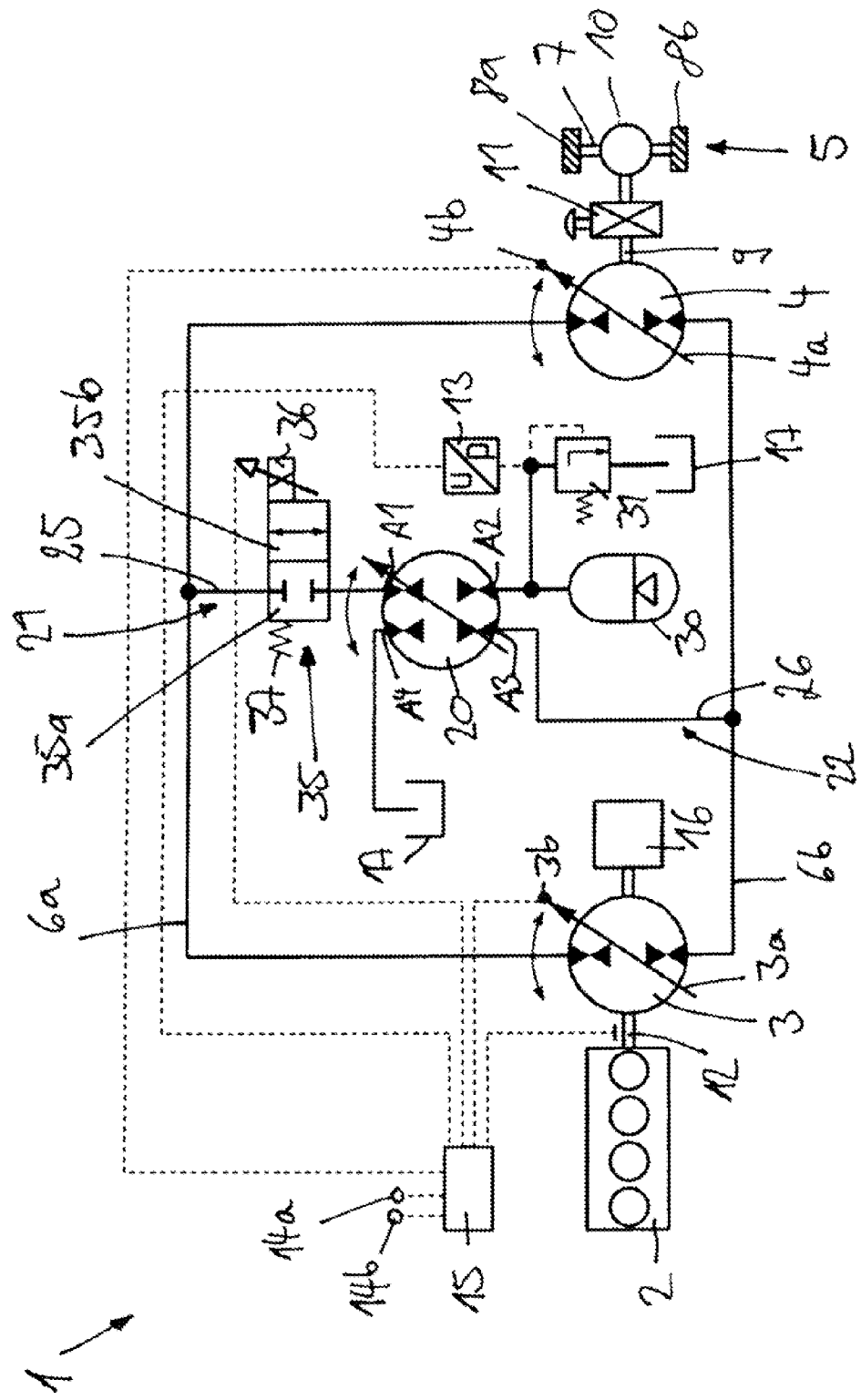
FIG. 3 shows a development of FIG. 1.

FIG. 3 illustrates a development of FIGS. 1 and 2, in which a switching valve 35 with a closed position 35a and an open position 35b is located in the accumulator flow path 21 or the tank flow path 22. In the illustrated embodiment, the switching valve 35 is located in the hydraulic line 25 that forms the accumulator flow path 21 and, therefore, controls the first delivery flow of the double drive unit 20.

The switching valve 35 can be actuated electrically, and for this purpose is in communication with an electrical actuator device 36. The electrical actuator device 36 is in communication for its actuation with the electronic control device 15. In the illustrated exemplary embodiment, the switching valve 35 is actuated by means of the spring 37 into the closed position 35a, and can be actuated into the open position by an actuation of the electrical actuator device 36. Alternatively, the spring 36 can actuate the switching valve 35 into the open position 35b and the electrical actuator device 36 can actuate the switching valve 35 into the closed position 35a.

Alternatively, the switching valve 35 can be located in the hydraulic line 26 that forms the tank flow path 20 and can therefore control the second delivery flow of the double drive unit 20.

With the switching valve 35, the operation of the double drive unit 20 can be prevented in the closed position 35a or allowed in the open position 35b, so that the switching valve 35 makes it possible to activate and deactivate the hybrid function of the hydrostatic accumulator 30 in a controlled manner.

In the exemplary embodiments illustrated in FIGS. 4 to 9, there is also a valve device 50 with which the accumulator flow path 21 and the tank flow path 22 of the double drive unit 20 can optionally each be connected with each of the two hydraulic connections 6a or 6b, respectively. With the valve device 50, it thereby becomes possible for both directions of movement of the consumer 5 to charge the hydrostatic accumulator 30 with energy from the drive motor 2 and/or with braking energy during a braking phase of the consumer 5, and to drive the consumer 5 in both directions of movement during the depressurization of the hydrostatic accumulator 30.

In the first control position 50a, the valve device 50 connects the accumulator flow path 21 with the first hydraulic connection 6a of the closed circuit, and simultaneously connects the tank flow path 22 with the second hydraulic connection 6b of the closed circuit. In the second control position 50b of the valve device 50, the accumulator flow path 21 is connected to the second hydraulic connection 6b of the closed circuit and simultaneously the tank flow path 22 is connected to the first hydraulic connection 6a of the closed circuit.

The valve device 50 is connected by means of the first connecting line 51a with the first hydraulic connection 6a of the closed circuit, and by means of a second connecting line 51b with the second hydraulic connection 6b of the closed circuit. The valve device 50 is connected by means of an accumulator line 52 with the first port A1 of the double drive unit 20 and by means of a tank line 53 with the third port A3 of the double drive unit 20.

Embodiments of the valve device 50 are illustrated in FIGS. 4 to 9.

The valve devices 50 illustrated in FIGS. 4 to 9 each have a first control position 50a, in which the accumulator line 52 is connected to the first hydraulic connection 6a of the closed circuit and the tank line 53 of the double piston accumulator 31 is simultaneously connected to the second hydraulic connection 6b of the closed circuit, and a second control position 50b, in which the accumulator line 52 is connected to the second hydraulic connection 6b of the closed circuit and the tank line 53 is simultaneously connected to the first hydraulic connection 6a of the closed circuit.

In the first control position 50a, the valve device 50 connects the first connecting line 51a with the accumulator line 52 and the second connecting line 51b with the tank line 53. In the second control position 50b, the valve device 50 connects the first connecting line 51a with the tank line 53 and the second connecting line 51b with the accumulator line 52.

Figure 4:
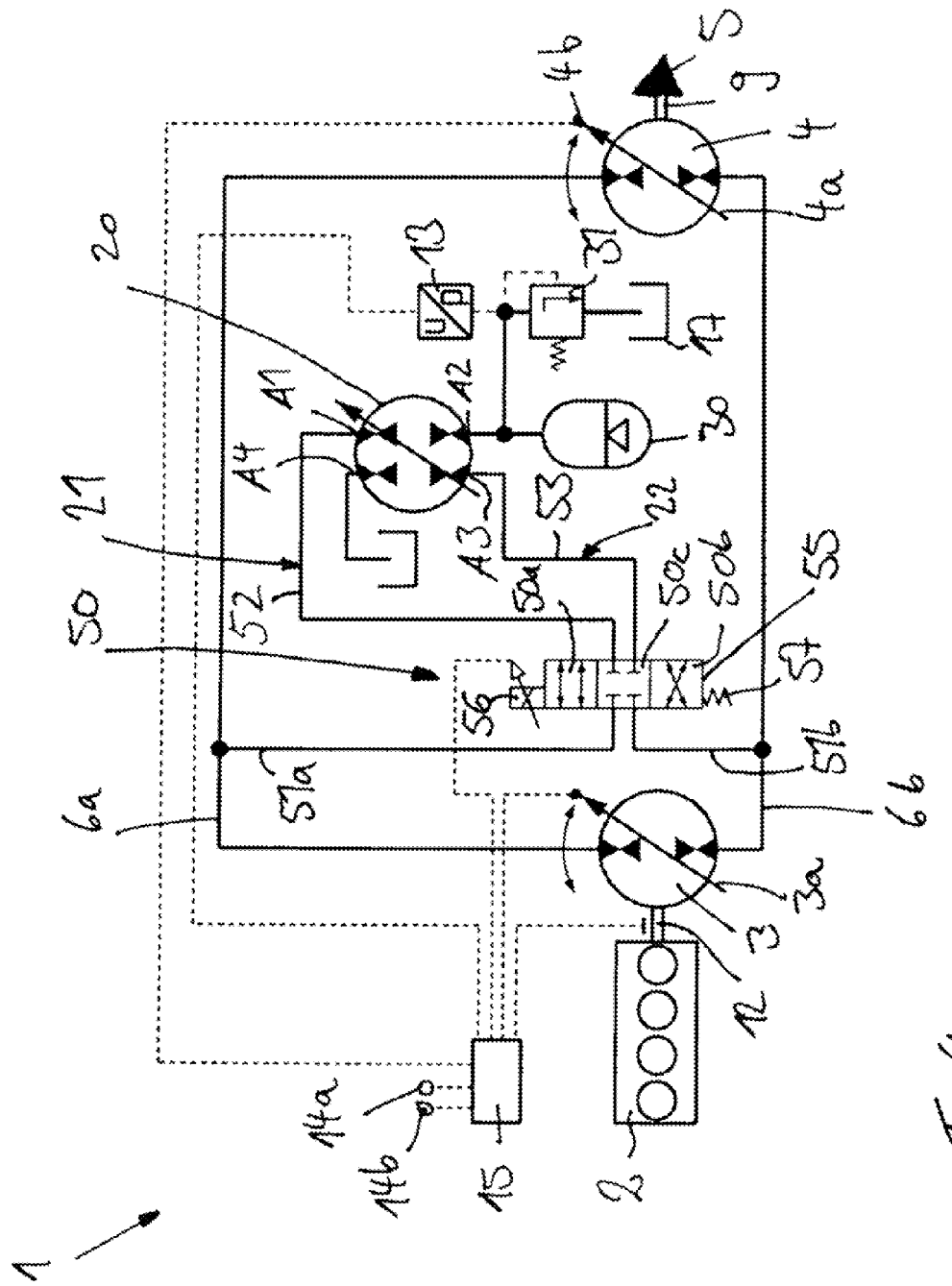
FIG. 4 shows a second embodiment of FIG. 1.
Figure 5:
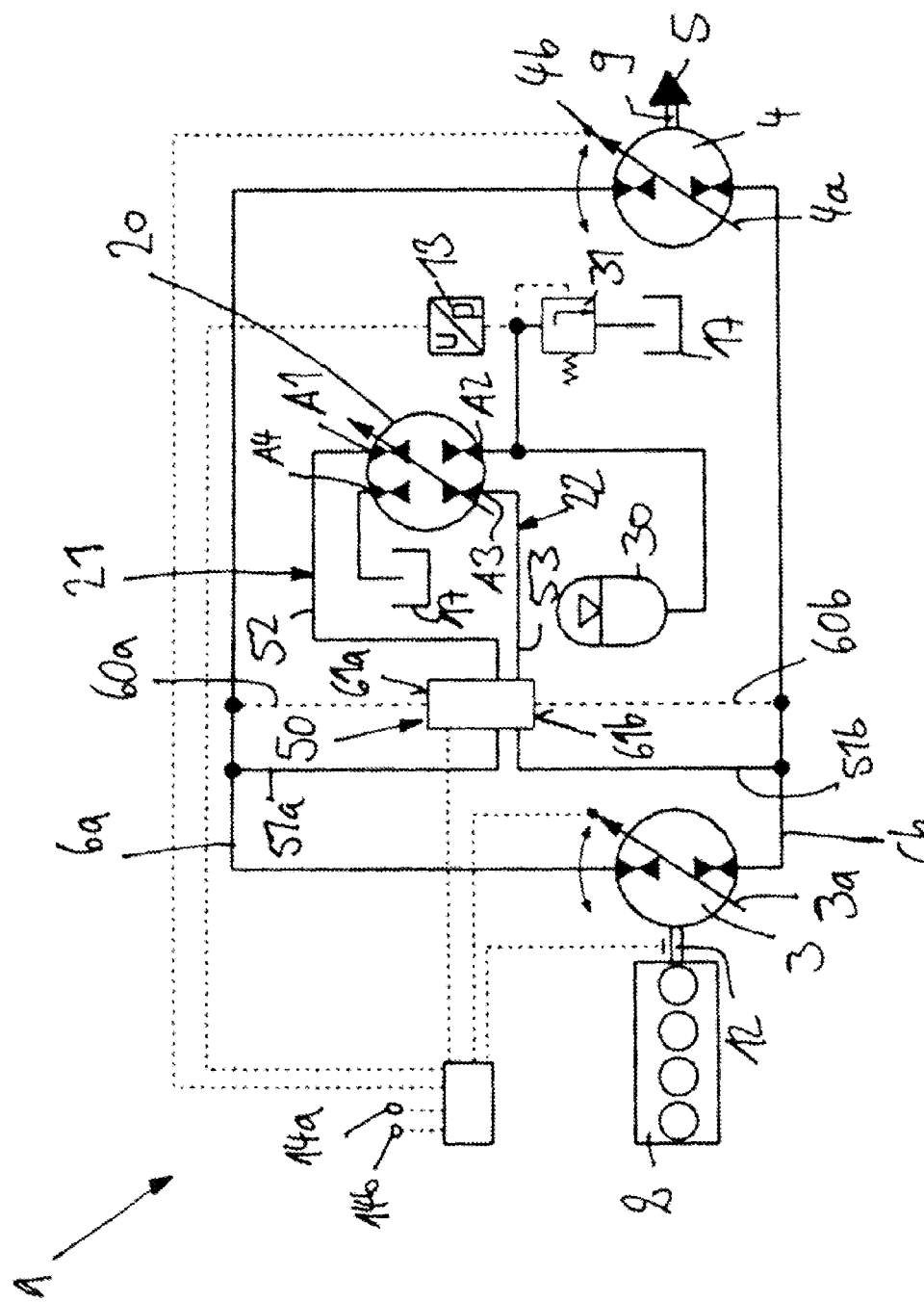
FIG. 5 shows a third embodiment of FIG. 1.
Figure 7:
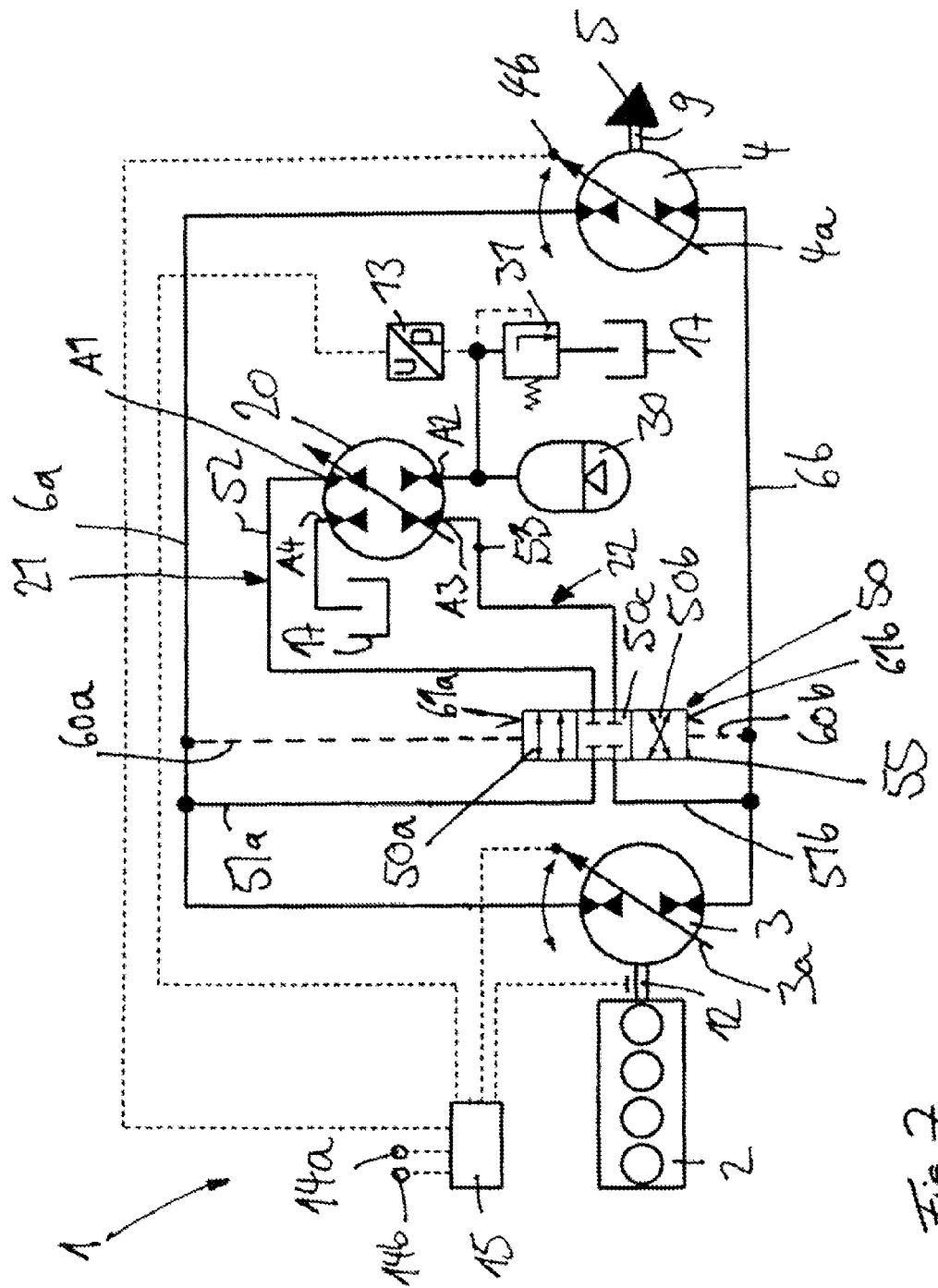
FIG. 7 shows a second configuration of FIG. 5.
Figure 8:
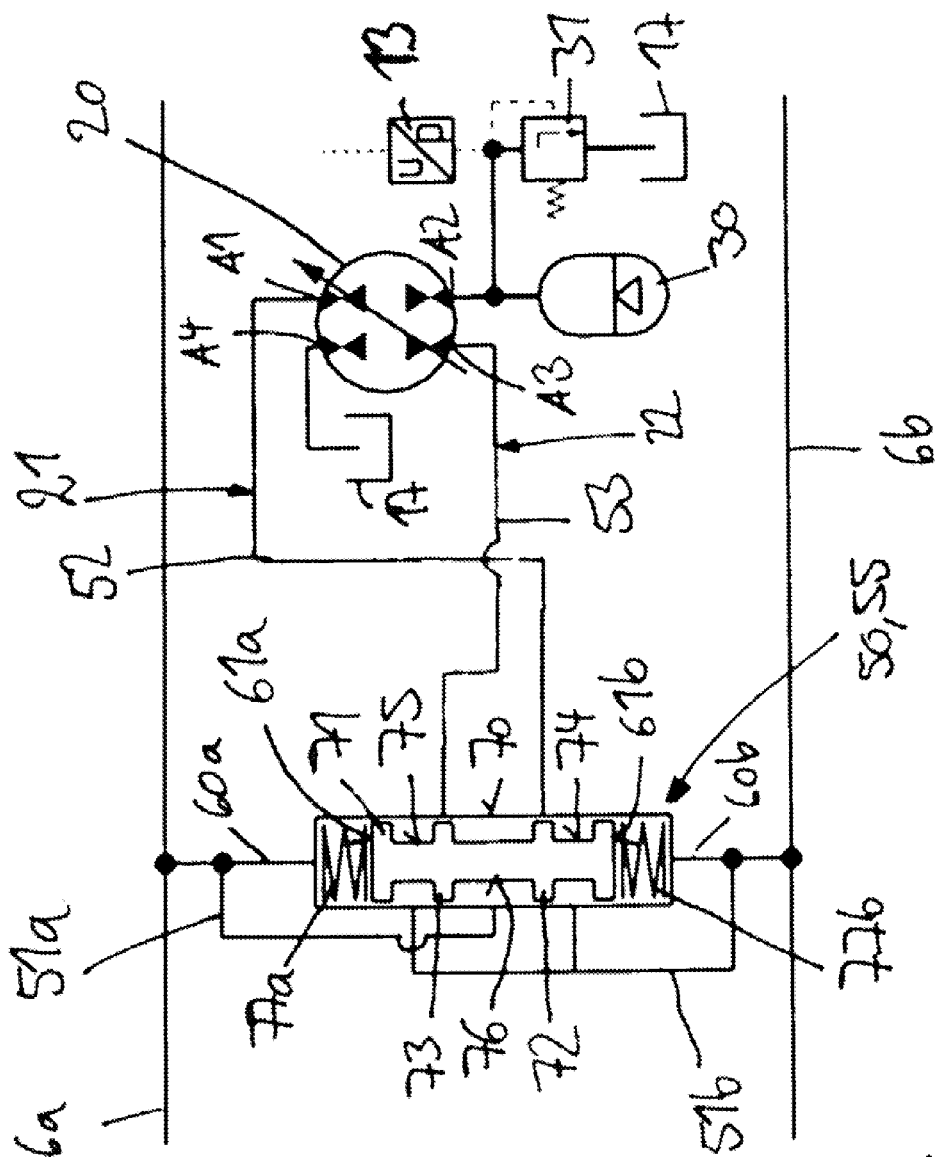
FIG. 8 shows a constructive embodiment of FIG. 7.

The valve device 50 illustrated in FIGS. 4, 7, and 8 also has a closed position 50c, in which the connection of the connecting lines 51a, 51b with the accumulator line 52 and the tank line 53 is shut off. In the closed position 50c, the hydrostatic accumulator 30 is therefore isolated from the hydraulic connections 6a, 6b of the closed circuit.

The valve device 50 illustrated in FIGS. 4, 7, and 8 is a four-port, three-position control valve 55, which has the first control position 50a and the second control position 50b, and is provided with the closed position 50c as the middle position.

FIG. 4 illustrates one embodiment of the valve device 50 in which the valve device 50 can be actuated electrically (or electronically), and is in communication for its actuation with the electronic control device 15. The valve device 50 in the illustrated exemplary embodiment can be actuated by at least one electrical actuator device 56, such as an actuator magnet or proportional magnet. The force of the electrical actuator device 56 counteracts the force of a spring device 57. In the illustrated exemplary embodiment, the spring device 57 actuates the valve device 50 into the second control position 50b, and the valve device 50 can be actuated into the closed position 50c and the first control position 50a by means of the electrical actuator device 56.

Instead of the illustrated embodiment of the electrical actuator, two springs can also be provided that actuate the valve device 50 into the closed position 50c, and two electrical actuator devices can be provided, wherein a first electrical actuator device actuates the valve device 50 into the first control position 50a and the second electrical actuator device actuates the valve device 50 into the second control position 50b.

FIGS. 5 to 9 illustrate embodiments of the valve device 50 in which the valve device 50 can be hydraulically actuated and for its actuation is connected with the hydraulic connections 6a, 6b of the closed circuit. The valve device 50 therefore forms a hydraulically controlled shuttle valve, with which the accumulator flow path 21 of the double drive 20 unit can be connected with the corresponding high-pressure side hydraulic connection 6a or 6b, respectively, and simultaneously the tank flow path 22 of the double drive unit 20 can be connected with the corresponding low-pressure side hydraulic connection 6b or 6a, respectively.

For the hydraulic actuation of the valve device 50, a first control pressure line 60a is provided which runs from the first hydraulic connection 6a of the closed circuit to a control surface 61a of the valve device 50 that acts in the direction of the first control position 50a, and a second control pressure line 60b which runs from the second hydraulic connection 6b of the closed circuit to a control surface 61b of the valve device 50 that acts in the direction of the second control position 50b.

Figure 6:
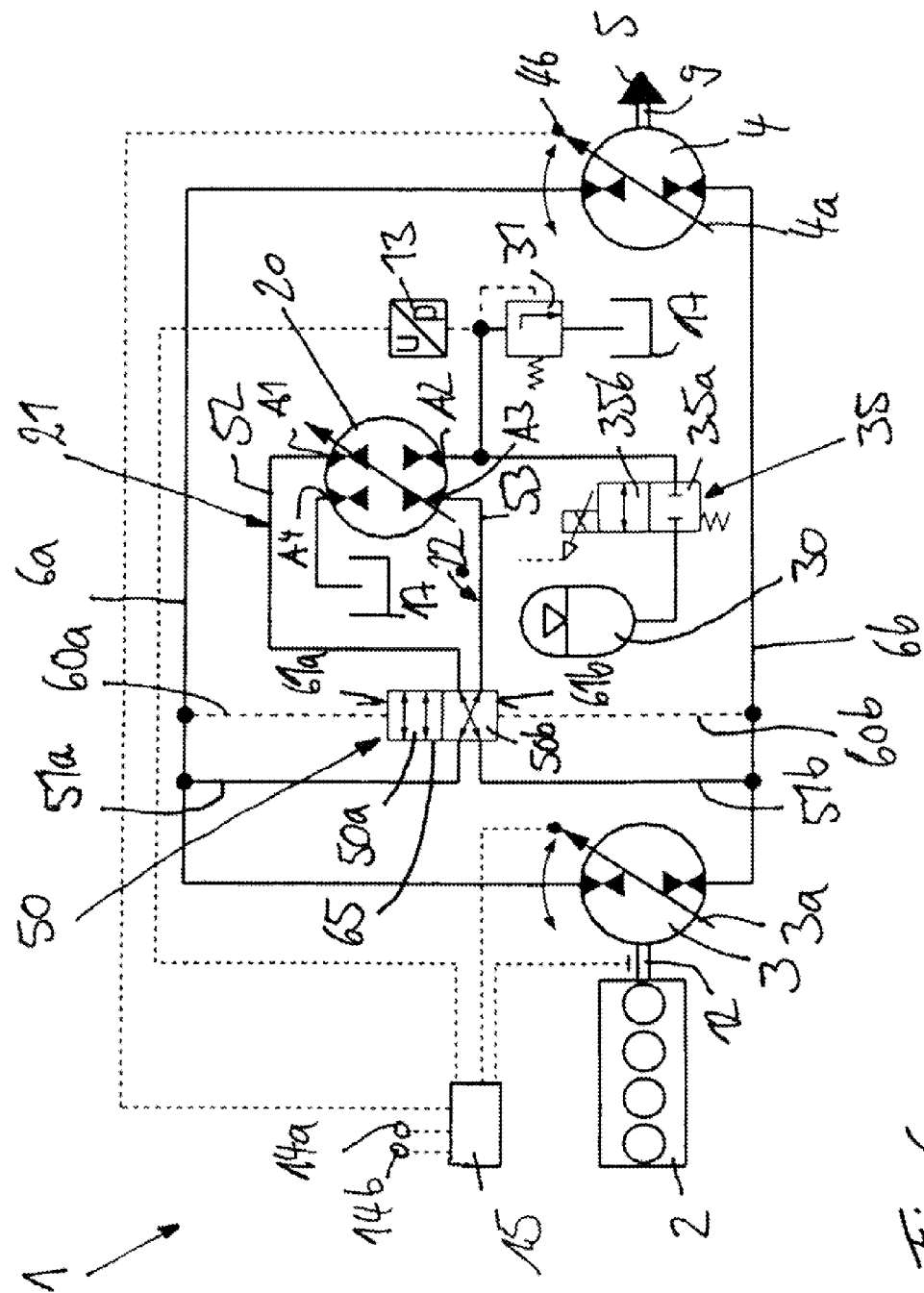
FIG. 6 shows a first configuration of FIG. 5.

In FIG. 6, the valve device 50 is a four-port, two-position control valve 65, which has a first control position 50a and a second control position 50b. In FIG. 6, the switching valve 35 is located in the accumulator flow path 21, which is analogous to the closed position 50c of the valve device 50 in FIGS. 4, 7, and 8 makes it possible to deactivate the function of the double drive unit 20 and, thus, of the hydrostatic accumulator 30 in the closed position 35a in a controlled manner.

FIGS. 7 and 8 show one configuration of a hydraulically actuated valve device 50 which, as in FIG. 4, is provided with a closed position 50c.

FIG. 8 shows one constructive embodiment of the valve device 50 in FIG. 7. The valve device 50 is in the form of the spool valve which comprises a control element 71 located in a housing bore 70. The control element 71 is provided with piston flanges 72 and 73, two outside control grooves 74 and 75, and a third control groove 76 located between the piston flanges 72 and 73. In the illustrated position, the valve device 50 is in the closed position, in which the piston flanges 72 and 73 shut off the hydraulic connections to the accumulator line 52 and the tank line 53. The control element 71 is actuated by means of two springs 77a and 77b into the closed position, which is the middle position. The springs 77a and 77b are each located in control pressure chambers which are connected with the control pressure line 60a or 60b, respectively. The control surfaces 61a and 61b are located on the end surfaces of the control element 71.

If the hydraulic connection 6a forms the high-pressure side of the closed circuit, the control element 71 is actuated downward in FIG. 8 by means of the control pressure line 60a into the first control position. In the first control position, via the control groove 76, the first connecting line 51a and, thus, the high-pressure side first hydraulic connection 6a are connected with the accumulator line 52 and thus via the accumulator flow path 21 of the double drive unit with the hydrostatic accumulator 30. In the first control position 50a, via the control groove 75, the second connecting line 51b and thus the low-pressure side second hydraulic connection 6b are also connected with the tank line 53 and thus via the tank flow path 22 of the double drive unit 20 with the tank 17.

If the hydraulic connection 6b forms the high-pressure side of the closed circuit, by means of the control pressure line 60b, the control element 71 is actuated upward in FIG. 8 into the second control position. In the second control position, via the control groove 74, the second connecting line 51b and thus the high-pressure side second hydraulic connection 6b is connected with the accumulator line 52 and thus via the accumulator flow path 21 of the double drive unit 20 with the hydrostatic accumulator 30. In the second control position 50b, by means of the control groove 76, the first connecting line 51a and, thus, the low-pressure side first hydraulic line 6a is connected with the tank line 53 and thus via the tank flow path 22 of the double drive unit 20 with the tank 17.

Figure 9:
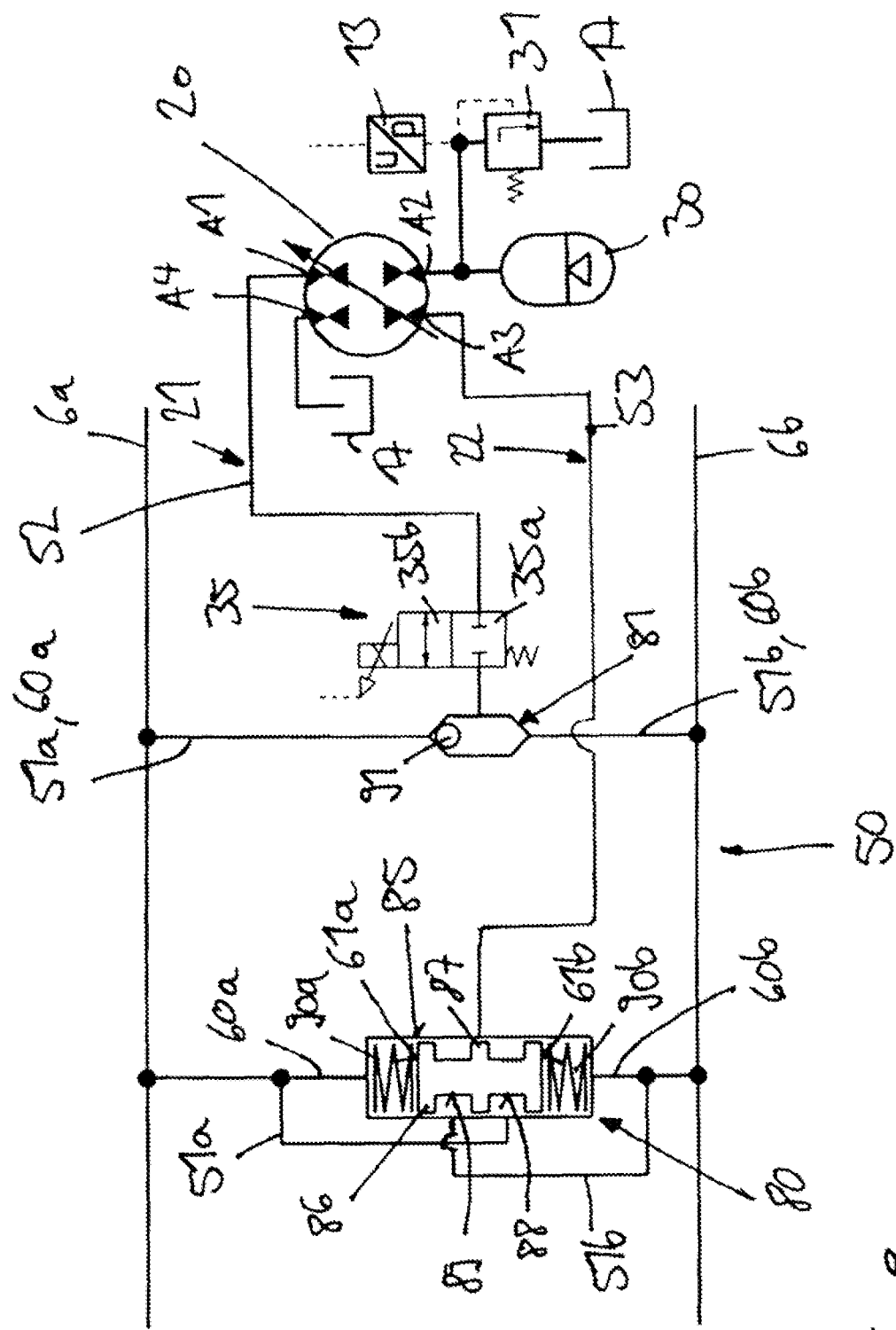
FIG. 9 shows an additional embodiment of FIG. 5.

FIG. 9 illustrates an embodiment of the invention in which the valve device 50 is formed by a plurality of individual valves and therefore the valve function of the valve device 50 is performed by a plurality of individual valves in a distributed construction.

The valve device 50 is controlled hydraulically as a function of the pressures present in the control pressure lines 60a, 60b and, thus, in the hydraulic connections 6a, 6b and therefore forms a hydraulically controlled shuttle valve.

The valve device 50 illustrated in FIG. 9 has a first shuttle valve 80 which is connected on the input side to the first connecting line 51a and to the second connecting line 51b, and on the output side to the tank line 53 and, thus, to the tank flow path 22. A second shuttle valve 81 is also connected on the input side to the first connecting line 51a and to the second connecting line 51b, and on the output side to the accumulator line 52 and, thus, to the accumulator flow path 21. The first shuttle valve 80 therefore controls the connection of the hydraulic connection 6a or 6b, respectively, with the tank flow path of the double drive unit 20. The second shuttle valve 81 correspondingly controls the connection of the hydraulic connection 6a or 6b, respectively, with the accumulator flow path 21 of the double drive unit 20.

The first shuttle valve 80 is a spool valve which comprises a control element 86 located in a housing bore 85. The control element 86 is provided with a piston flange 87 and two outside control grooves 88 and 89. In the illustrated position, the first shuttle valve 80 is in the closed position, in which the piston flange 87 closes the hydraulic connection to the low pressure accumulator line 53. The control element 86 is actuated into the closed position, which is the middle position, by means of two springs 90a, 90b. The springs 90a, 90b are located in respective control pressure chambers that are connected with the control pressure line 60a or 60b, respectively. The control surfaces 61a, 61b are located on the end surfaces of the control element 86.

If the hydraulic connection 6a forms the high-pressure side of the closed circuit, the control element 86 is actuated downward in FIG. 9 by means of the control pressure line 60a into the first control position. In the first control position, by means of the control groove 89, the tank line 53 and, thus, the tank flow path 22 of the double drive unit 20 are connected with the second connecting line 51b and thus the low-pressure side second hydraulic connection 6b.

If the hydraulic connection 6b forms the high-pressure side of the closed circuit, by means of the control pressure line 60b, the control element 86 is actuated upward in FIG. 9 into the second control position. In the second control position, the tank line 53 and, thus, the tank flow path 22 of the double drive unit 20 is connected via the control groove 88 with the first connecting line 51a and thus the low-pressure side first hydraulic connection 6a.

The first shuttle valve 80, in the first control position, therefore connects the second connecting line 51b with the tank line 53, and in the second control position connects the first connecting line 51a with the tank line 53.

The second shuttle valve 81 is a check valve with a valve element 91. The check valve is connected at opposite inputs to the lines, each of which performs the function of the control pressure line 60a, 60b, and to the connecting line 51a, 51b. On the output side, the check valve is connected to the accumulator line 52.

If the hydraulic connection 6a forms the high-pressure side of the closed circuit, the valve element 91 of the check valve is actuated by means of the control pressure line 60a downward into the position illustrated in FIG. 9 into the first control position in which the accumulator line 52 and thus the accumulator flow path 22 of the double drive unit 20 is connected with the first connecting line 51a.

If the hydraulic connection 6b forms the high-pressure side of the closed circuit, the valve element 91 of the check valve is actuated upward in FIG. 9 by means of the control pressure line 60b, so that the accumulator line 52 and thus the accumulator flow path 22 of the double drive unit 20 is connected with the second connecting line 51b.

The second shuttle valve 81, in the first control position, therefore connects the first connecting line 51a with the accumulator line 52, and in the second control position connects the second connecting line 51b with the accumulator line 52.

Located in accumulator line 52, analogous to FIGS. 3 and 6, is an electrically actuatable switching valve 35 with which, in the closed position 35a, the function of the double drive unit 20 and, thus, of the hydrostatic accumulator 30 can be deactivated in a controlled manner.

The distributed construction of the valve function of the valve device 50 can, as an alternative to the configuration illustrated in FIG. 9, be formed by four individual valves, a first individual valve of which controls the connection of the first connecting line 51a with the accumulator line 52, a second individual valve controls the connection of the first connecting line 51a with the tank line 53, a third individual valve controls the connection of the second connecting line 51b with the accumulator line 52, and a fourth individual valve controls the connection of the second connecting line 51b with the tank line 53. The individual valves can each be switching valves with a closed position and an open position, and each of them can be hydraulically or electrically (electronically) actuated.

The valve device 50 in FIGS. 4 to 9 can be a switch valve or a proportional valve.

Figure 10:
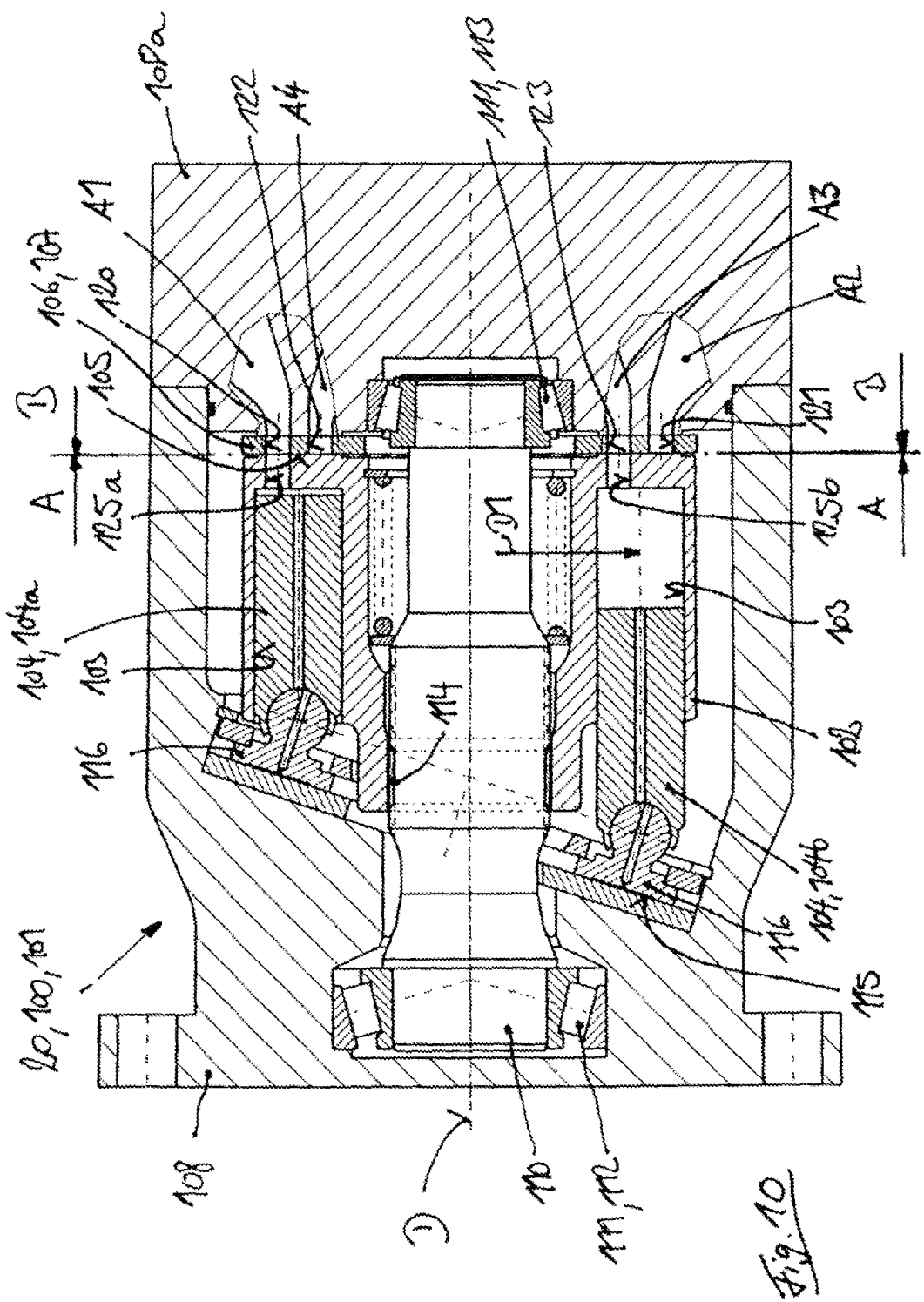
FIG. 10 shows a double drive unit of the hydrostatic drive system of the invention in longitudinal section.

FIG. 10 shows a dual-flow hydrostatic double drive unit 20 of the invention that has two separate, independent delivery flows for the accumulator flow path 21 and the tank flow path 22 in longitudinal section. In the illustrated exemplary embodiment, the double drive unit 20 is a piston displacement machine 100. In the illustrated embodiment, the double drive unit 20 is an axial piston machine 101, such as, an axial piston machine employing a swashplate construction.

The double drive unit 20 has a cylinder barrel 102 located so that it can rotate around an axis of rotation D which is provided with a plurality of piston bores 103 which are concentric to the axis of rotation D. The bores are preferably formed by cylinder bores and in each of which a longitudinally displaceable piston 104 is mounted. The pistons 104 and the piston bores 103 are located with their center axis on the same reference diameter D1 and therefore concentric to the axis of rotation D. The pistons 104 and the piston bores 103 distributed around the reference circle have equal diameters and therefore equal surface areas.

The cylinder barrel 102 is supported in the axial direction with one end surface on a control surface 105 that is stationary with respect to the housing and is formed on a control body 106. In the illustrated exemplary embodiment, the control body 106 is a disc-shaped valve plate 107. The control body 106 is fastened non-rotationally to a housing 108 or to a corresponding housing cover 108a of the housing 108.

The cylinder barrel 102 is traversed by a central bore, through which a shaft 110 which is concentric to the axis of rotation D runs through the cylinder barrel 102. The shaft 110 is rotationally mounted in the housing 108 by means of a shaft bearing 111, which in the illustrated exemplary embodiment is formed by two bearings 112, 113. The cylinder barrel 102 is rotationally synchronous with the shaft 110, although the cylinder barrel 102 is connected so that it is axially displaceable by means of gearing 114 in the area of the cylinder barrel 102 that faces an eccentric disc 115.

The pistons 104 are supported in the area in which they project out of the cylinder barrel 102 on an eccentric disc 115, such as a swashplate which generates a displacement and is oriented at an inclination to the axis of rotation D. The eccentric disc 115, as illustrated in FIG. 10, can be molded onto or fastened to the housing 108, whereby the double drive unit 20 has a fixed displacement volume. It is also possible, however, to make the inclination of the eccentric disc 115 variable by means of an adjustment device such as a swivel cradle, as a result of which the double drive unit 20 has a variable displacement volume.

In the illustrated exemplary embodiment, the pistons 104 are each supported on the eccentric disc 115 by means of a support element in the form of a slipper 116.

The control body 106 of the two-flow double drive unit 20 of the invention is illustrated in greater detail in FIG. 11, which shows a plan view of the control body 106. The control body 106 is provided with accumulator control bores 120, 121 which form the accumulator flow path 21 of the double drive unit 20. The accumulator control bore 120 is in communication with the port A1 of the double drive unit 20. The accumulator control bore 121 is in connection with the port A2 of the double drive unit 20.

The control body 106 of the two-flow double drive unit of the invention is also provided with tank control bores 122, 123 which form the tank flow path 22 of the double drive unit 20. The tank control bore 122 is in communication with the port A4 of the double drive unit 20. The tank control bore 123 is in communication with the port A3 of the double drive unit 20.

The accumulator control bores 120, 121 and the tank control bores are each formed by kidney-shaped control slots that are broken up in the illustrated exemplary embodiment into a plurality of kidney-shaped segments.

The accumulator control bores 120, 121 are located on a first reference diameter D2. The tank control bores 122, 123 are located on a second reference diameter D3, which is different from the first reference diameter D2. In the illustrated exemplary embodiment, the first reference diameter D2 is greater than the second reference diameter D3.

The dual-flow double drive unit 20 is provided with an even number of pistons 104, wherein the pistons 104 in the peripheral direction of the cylinder barrel 102 actuate the respective accumulator control bores 120, 121 or the tank control bores 122, 123, in alternation. Those pistons 104a that actuate the accumulator control bores 120, 121 therefore form a hydrostatic drive unit in the accumulator flow path 21 and those pistons 104b that actuate the tank control bores 122, 123, form an additional hydrostatic drive unit in the tank flow path 22. The pistons 104a of the hydrostatic drive unit in the accumulator flow path 21 and the pistons 104b of the additional hydrostatic drive unit in the tank flow path 22 are therefore located in alternation in the peripheral direction of the cylinder barrel 102.

On account of the even number of pistons 104 of the double drive unit 20, the hydrostatic drive unit in the accumulator flow path 21 and the additional hydrostatic drive unit in the tank flow path 22 each have an even number of pistons 104a or 104b, respectively. Because the pistons 104a, 104b are located on a common reference diameter D1, the piston strokes of the pistons 104a, 104b are also equal. Because the pistons 104a, 104b also have equal areas, the hydrostatic drive unit in the accumulator flow path 21 and the additional hydrostatic drive unit in the tank flow path 22 of the two-flow double drive unit 20 of the invention have equal delivery volumes.

To ensure that the pistons 104a that form the hydrostatic drive unit in the accumulator flow path 21 actuate only the accumulator control bores 120, 121 and are in communication with them during a rotation of the cylinder barrel 102 around the axis of rotation D, the piston bores 103 of the pistons 104a are each provided with a communication channel 125a for communication with the accumulator control bores 120, 121 (as shown in greater detail in FIG. 12, which shows a plan view of the end surface of the cylinder barrel 102 in contact with the control body 106). The communicating channels 125a of the pistons 104a are located on the first reference diameter D2 on which the accumulator control bores 120, 121 are also located.

To ensure that the pistons 104b that form the additional hydrostatic drive unit in the tank flow path 22 actuate only the tank control bores 122, 123 and come into communication with them during a rotation of the cylinder barrel 102, the piston bores 103 of the pistons 104b (as shown in greater detail in FIG. 12) are each provided with a communicating channel for the communication with the tank control bores 122, 123. The communicating channels 125b of the pistons 104b are located on the second reference diameter D3, on which the tank control bores 122, 123 are also located.

In the illustrated exemplary embodiment each of the communication channels 125a, 125b are kidney-shaped.

In the dual-flow double drive unit 20 of the invention, two separate hydrostatic drive units with identical delivery volumes for a four-quadrant operation are achieved with the pistons 104a, 104b located on the same reference circle D1 and the two accumulator control bores 120, 121 and the two tank control bores 122, 123, each of which is connected with one of the ports A1 to A4, located on the different reference circles D2, D3 with a single cylinder barrel 102, a single bearing 111 for the cylinder barrel 102, and a single housing 108.

In the invention, operating strategies are stored in the electronic control device 15 that actuates the displacement volume control device 3a of the pump 3 (which is a variable displacement pump) and, in the case of a motor 4 (in the form of a variable motor) the displacement volume control device 4a of the variable motor, to charge the hydrostatic accumulator 30 with hydraulic fluid as a function of the operating conditions of the drive system 1 with energy from the drive motor 2 and/or, during braking operation of the consumer 5, with braking energy from the consumer 5. The charging of the hydrostatic accumulator 30 with the braking energy in a braking phase of the consumer 5 therefore makes it possible to recover energy during the braking of the consumer 5.

Also stored in the electronic control device 15 are operating strategies to use the hydraulic fluid from the charged hydrostatic accumulator 30 as a function of the operating conditions of the drive system 1 for the drive of the hydrostatic motor 4 and/or for the drive of the hydrostatic pump 3.

During the charging and discharging of the hydrostatic accumulator 30, the electronic control device 15 actuates the displacement volume control devices 3*a* and 4*a*, respectively, and the speed of rotation of the drive motor 2 as a function of the input variables from the signal generators 14*a*, 14*b* and from the pressure sensor 13. When the valve device 50 is in the form of an electrically actuatable valve device 50, the electronic control device 15 also actuates the valve device 50 as a function of the input variables from the signal generators 14*a*, 14*b*.

The drive system of the motor 4 can use the energy stored in the hydrostatic accumulator 30 to drive the motor 4. The hydrostatic accumulator 30 therefore makes possible a booster drive of the running drive motor 2. Alternatively or additionally, the energy stored in the hydrostatic accumulator 30 can be used to drive the pump 3. The hydrostatic accumulator 30, in combination with the pump 3, therefore makes possible the function of a hydraulic starter of the shutoff drive motor 2 in the framework of a start-stop function of the drive motor 2. For the function of the pump 3 as a hydraulic starter that is driven by the hydraulic fluid from the hydrostatic accumulator 30, the motor 4 in the form of a variable displacement motor is set to the displacement volume of zero.

The hybrid function of the hydrostatic accumulator 30 of the invention can therefore be used to assist the running drive motor 2 and/or as a hydraulic starter in the framework of a start-stop function of the drive motor 2, wherein on account of the robust construction and function of the pump 3, a start-stop function of the drive motor can be achieved economically. When the drive motor 2 is an internal combustion engine, with the hybrid function formed by the hydrostatic accumulator 30, a reduction of fuel consumption and a reduction of emissions can both be achieved during the operation of the drive system 1.

The dual-flow double drive unit 20 which establishes the quantitative or volume balance in the low-pressure side hydraulic connection 6*a* or 6*b*, respectively, of the closed circuit during the charging or discharging of the hydrostatic accumulator 30 is compact, has a robust construction and function and is economical, so that with the double drive unit 20, in combination with the hydrostatic accumulator 30, it is possible with little added construction effort and expense to provide a hydrostatic drive system 1 in the closed circuit with a hybrid function that makes it possible to extract energy from the closed circuit or add energy to the closed circuit. Because the double drive unit 20 has two separate and equal delivery flows in the accumulator flow path 21 and the tank flow path 22, it is possible with a double drive unit 20 in a simple manner to achieve a theoretically exact quantitative and volume balance at the low-pressure side hydraulic connection 6*a* or 6*b*, respectively, of the closed circuit.

The invention is not limited to the exemplary embodiments illustrated and/or explained above.

The consumer 5, as an alternative to a traction drive, can be a slewing gear of the vehicle, for example, a machine in the form of an excavator.

The pump 3 and the motor 4 of the hydrostatic drive system 1 can be an axial piston machine that utilizes a swashplate construction or a bent axis construction. Alternatively, the pump 3 and/or the motor 4 can be a radial piston machine or a gearwheel machine.

The drive motor 2, as an alternative to an internal combustion engine, can be an electric motor or a turbine.

The double drive unit 20 can be a constant displacement machine as illustrated in FIGS. 1, 2, and 10 or a variable displacement machine as illustrated in FIGS. 3 to 9.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. A hydrostatic drive system, comprising:
a hydrostatic pump driven by a drive motor and connected in a closed circuit with a hydrostatic motor, wherein the closed circuit is formed by a first hydraulic connection and a second hydraulic connection;
a hydrostatic accumulator connectable with at least one of the hydraulic connections for the storage of energy and the output of energy;
a hydrostatic drive unit located in an accumulator flow path between one of the hydraulic connections and the hydrostatic accumulator;
an additional hydrostatic drive unit located in a tank flow path between the other of the two hydraulic connections and a tank, wherein the hydrostatic drive unit and the additional hydrostatic drive unit are formed as a single hydrostatic dual-flow double drive unit, and
a valve device having a first control position in which the accumulator flow path is connected to the first hydraulic connection of the closed circuit and simultaneously the tank flow path is connected to the second hydraulic connection of the closed circuit, and a second control position in which the accumulator flow path is connected to the second hydraulic connection of the closed circuit and simultaneously the tank flow path is connected to the first hydraulic connection of the closed circuit,
wherein the valve device is connected by means of a first connecting line with the first hydraulic connection of the closed circuit, by means of a second connecting line with the second hydraulic connection of the closed circuit, by means of an accumulator line of the accumulator flow path with a first port of the double drive unit, and by means of a tank line of the tank flow path with a third port of the double drive unit.

2. The hydrostatic drive system as recited in claim 1, wherein the double drive unit includes equal displacement volumes for the accumulator flow path and the tank flow path.

3. The hydrostatic drive system as recited in claim 1, wherein the accumulator flow path between one of the two hydraulic connections and the hydrostatic accumulator runs from one of the hydraulic connections to the first port of the double drive unit and from a second port of the double drive unit to the hydrostatic accumulator.

4. The hydrostatic drive system as recited in claim 1, wherein the tank flow path between the other of the two hydraulic connections and the tank runs from the other of the two hydraulic connections to the third port of the double drive unit and from a fourth port of the double drive unit to the tank.

5. The hydrostatic drive system as recited in claim 1, wherein the double drive unit comprises a piston displacement machine, and wherein the hydrostatic drive unit and the additional hydrostatic drive unit have the same displacement volume.

6. The hydrostatic drive system as recited in claim 5, wherein the double drive unit includes a rotational cylinder barrel in which at least one piston of the hydrostatic drive unit and at least one piston of the additional hydrostatic drive unit are longitudinally displaceable, wherein the hydrostatic drive unit and the additional hydrostatic drive unit have the same number of pistons, and wherein the pistons, have equal stroke lengths.

7. The hydrostatic drive system as recited in claim 6, wherein the double drive unit includes a housing in which the cylinder barrel is rotationally mounted by means of a bearing.

8. The hydrostatic drive system as recited in claim 6, wherein the at least one piston of the hydrostatic drive unit and the at least one piston of the additional hydrostatic drive unit are located in alternation in a peripheral direction of the cylinder barrel.

9. The hydrostatic drive system as recited in claim 5, wherein a control body of the double drive unit includes accumulator control bores that control the accumulator flow path, and tank control bores that control the tank flow path, and wherein the at least one piston of the hydrostatic drive unit engages only the accumulator control bores and the at least one piston of the additional hydrostatic drive unit engages only the tank control bores.

10. The hydrostatic drive system as recited in claim 6, wherein the double drive unit comprises an axial piston machine, wherein the at least one piston of the hydrostatic drive unit and the at least one piston of the additional hydrostatic drive unit are located on the same reference circle in the rotational cylinder barrel.

11. The hydrostatic drive system as recited in claim 10, wherein a control body comprises a valve plate on which the cylinder barrel is supported with one end surface, wherein accumulator control bores are located on a first reference diameter and tank control bores are located on a second reference diameter which is different from the first reference diameter.

12. The hydrostatic drive system as recited in claim 11, wherein the pistons are longitudinally displaceable in piston bores of the cylinder barrel, wherein each piston bore includes a communicating channel for communication with the accumulator control bores or the tank control bores, wherein the communicating channels of the pistons of the hydrostatic drive unit are located on the first reference diameter and the communicating channels of the pistons of the additional hydrostatic drive unit are located on the second reference diameter.

13. The hydrostatic drive system as recited in claim 1, wherein the double drive unit comprises a fixed displacement machine, wherein the hydrostatic drive unit and the additional hydrostatic drive unit each have a fixed displacement volume.

14. The hydrostatic drive system as recited in claim 1, wherein the double drive unit comprises a variable displacement machine, wherein the hydrostatic drive unit and the additional hydrostatic drive unit each have a variable displacement volume.

15. The hydrostatic drive system as recited in claim 1, wherein the valve device includes a closed position in which the connections of the connecting lines with the accumulator line and/or with the tank accumulator line is/are shut off.

16. The hydrostatic drive system as recited in claim 1, wherein the valve device is a four-port, two-position control valve, which has the first control position and the second control position.

17. The hydrostatic drive system as recited in claim 1, wherein the valve device is a four-port, three-position control valve, which has the first control position and the second control position and is provided with the closed position as a middle position.

18. The hydrostatic drive system as recited in claim 1, wherein the valve device comprises a plurality of individual valves.

19. The hydrostatic drive system as recited in claim 18, wherein the valve device comprises a first shuttle valve, which is connected on the input side to the first connecting line and to the second connecting line, and is connected on the output side to the tank line, and a second shuttle valve, which is connected on the input side to the first connecting line and to the second connecting line, and is connected on the output side to the accumulator line.

20. The hydrostatic drive system as recited in claim 19, wherein the first shuttle valve in the first control position connects the second connecting line with the tank line, and in the second control position connects the first connecting line with the tank line, and the second shuttle valve in the first control position connects the first connecting line with the accumulator line and in the second control position connects the second connecting line with the accumulator line.

21. The hydrostatic drive system as recited in claim 1, wherein the hydrostatic pump is a variable displacement pump with a variable displacement volume, and the hydrostatic motor is selected from the group consisting of a constant motor with a fixed displacement volume and a variable motor with a variable displacement volume.

22. The hydrostatic drive system as recited in claim 21, including an electronic control device, wherein for variation of the displacement volume of the variable displacement pump and/or of the variable motor, operating strategies are stored in the electronic control device to charge the hydrostatic accumulator with hydraulic fluid as a function of the operating conditions of the drive system with energy from the drive motor and/or during the braking operation of the consumer with braking energy from the consumer.

23. The hydrostatic drive system as recited in claim 22, wherein operating strategies are stored in the electronic control device to use the hydraulic fluid from the charged accumulator as a function of the operating conditions of the drive system to drive the hydrostatic motor and/or to drive the hydrostatic pump.

24. The hydrostatic drive system as recited in claim 22, wherein the variable motor can be set to a displacement volume of zero and the variable motor, during the drive of the hydrostatic pump by the hydraulic fluid from the charged hydrostatic accumulator, is set to the displacement volume zero.

25. The hydrostatic drive system as recited in claim 22, wherein the electronic control device is in communication with a pressure sensor that measures the accumulator charge pressure of the hydrostatic accumulator.

26. The hydrostatic drive system as recited in claim 1, wherein the valve device is actuated electrically and for its actuation is in communication with an electronic control device.

27. The hydrostatic drive system as recited in claim 1, wherein the valve device is actuated hydraulically and for its actuation is connected with the hydraulic connections of the closed circuit.

28. The hydrostatic drive system as recited in claim 27, wherein a first control pressure line runs from the first hydraulic connection of the closed circuit to a control surface of the valve device that acts in the direction of the first control position, and a second control pressure line runs from the second hydraulic connection of the closed circuit to a control surface of the valve device that acts in the direction of the second control position.

29. The hydrostatic drive system as recited in claim 1, wherein the consumer comprises a slewing gear of a vehicle.

30. The hydrostatic drive system as recited in claim 1, wherein the consumer comprises a traction drive system of a vehicle.

31. The hydrostatic drive system as recited in claim 1, wherein the hydrostatic drive system comprises a continuously variable hydrostatic branch of a power split transmission.

32. A vehicle, comprising:
at least one consumer; and
a hydrostatic drive system in connection with the at least one consumer, comprising:
  a hydrostatic pump driven by a drive motor and connected in a closed circuit with a hydrostatic motor, wherein the hydrostatic motor is in a drive connection with the consumer, wherein the closed circuit is formed by a first hydraulic connection and a second hydraulic connection;
  a hydrostatic accumulator connectable with at least one of the hydraulic connections for the storage of energy and the output of energy;
  a hydrostatic drive unit located in an accumulator flow path between one of the hydraulic connections and the hydrostatic accumulator;
  an additional hydrostatic drive unit located in a tank flow path between the other of the two hydraulic connections and a tank, wherein the hydrostatic drive unit and the additional hydrostatic drive unit are formed as a single hydrostatic dual-flow double drive unit, and
  a valve device having a first control position in which the accumulator flow path is connected to the first hydraulic connection of the closed circuit and simultaneously the tank flow path is connected to the second hydraulic connection of the closed circuit, and a second control position in which the accumulator flow path is connected to the second hydraulic connection of the closed circuit and simultaneously the tank flow path is connected to the first hydraulic connection of the closed circuit,
wherein the valve device is connected by means of a first connecting line with the first hydraulic connection of the closed circuit, by means of a second connecting line with the second hydraulic connection of the closed circuit, by means of an accumulator line of the accumulator flow path with a first port of the double drive unit, and by means of a tank line of the tank flow path with a third port of the double drive unit.

* * * * *